US011082101B2

(12) United States Patent
Kretsch et al.

(10) Patent No.: US 11,082,101 B2
(45) Date of Patent: Aug. 3, 2021

(54) CHANNELIZING AND BEAMFORMING A WIDEBAND WAVEFORM

(71) Applicant: Viasat, Inc., Carlsbad, CA (US)

(72) Inventors: Michael T. Kretsch, San Diego, CA (US); David C. Jacobs, Solana Beach, CA (US); David J. Trusheim, Poway, CA (US); Robert T. Short, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 16/598,261

(22) Filed: Oct. 10, 2019

(65) Prior Publication Data

US 2021/0111774 A1 Apr. 15, 2021

(51) Int. Cl.
*H04B 7/06* (2006.01)
*H04B 1/713* (2011.01)

(52) U.S. Cl.
CPC ........... *H04B 7/0617* (2013.01); *H04B 1/713* (2013.01)

(58) Field of Classification Search
CPC ............................. H04B 7/0617; H04B 1/713
USPC ........................................................ 375/267
See application file for complete search history.

(56) References Cited

U.S. PATENT DOCUMENTS

| 4,112,430 | A | 9/1978 | Ladstatter |
| 5,838,732 | A | 11/1998 | Carney |
| 6,560,463 | B1 | 5/2003 | Santhoff |
| 6,898,235 | B1 * | 5/2005 | Carlin ................... H04B 1/001 342/147 |
| 6,937,674 | B2 | 8/2005 | Santhoff et al. |
| 7,430,257 | B1 | 9/2008 | Shattil |

(Continued)

FOREIGN PATENT DOCUMENTS

| CA | 2537395 A1 | 8/2006 |
| CN | 106685476 B | 2/2019 |

OTHER PUBLICATIONS

Sklivanitis et al., "All-Spectrum Cognitive Channelization around Narrowband and Wideband Primary Stations", IEEE, 2015, 8 pgs.
(Continued)

*Primary Examiner* — Hirdepal Singh
(74) *Attorney, Agent, or Firm* — Murphy, Bilak & Homiller, PLLC

(57) ABSTRACT

Methods, systems, and devices for channelizing and beamforming a wideband waveform are described. Generally, the described techniques provide for transmitting and receiving wideband waveforms that are beamformed on a per-channel basis during generation of the wideband waveforms. A transmitter may separate a first wideband signal into segments, with each segment bandwidth corresponding to a channel of the system bandwidth, and may map the segments to channels. The segments may be replicated to generate multiple copies of each segment. The transmitter may beamform and combine the copies of the segments to generate multiple wideband waveforms, and transmit each wideband waveform using a different antenna. A receiver may receive multiple wideband waveforms using multiple antennas and may separate each wideband waveform into segments, then beamform and de-map the segments. The techniques may be used to transmit and receive beamformed wideband waveforms over tactical data links.

30 Claims, 12 Drawing Sheets

(56) References Cited

U.S. PATENT DOCUMENTS

| | | | |
|---|---|---|---|
| 7,965,761 | B2 | 6/2011 | Shattil |
| 8,107,887 | B2 | 1/2012 | Rao et al. |
| 8,155,649 | B2 | 4/2012 | McHenry et al. |
| 9,094,109 | B2 | 7/2015 | Revol |
| 9,209,891 | B1* | 12/2015 | Mandell ............... H04B 7/1851 |
| 9,385,798 | B1 | 7/2016 | Marr et al. |
| 9,722,660 | B1 | 8/2017 | McCloskey et al. |
| 2005/0190777 | A1 | 9/2005 | Hess et al. |
| 2006/0013327 | A1 | 1/2006 | Sugar et al. |
| 2007/0135052 | A1* | 6/2007 | Park ........................ H04L 5/023 |
| | | | 455/63.1 |
| 2009/0067513 | A1 | 3/2009 | Kim et al. |
| 2012/0113831 | A1 | 5/2012 | Pelletier |
| 2012/0170672 | A1 | 7/2012 | Sondur |
| 2016/0137311 | A1 | 5/2016 | Peverill et al. |
| 2016/0182266 | A1* | 6/2016 | Gaal ................... H04L 27/2042 |
| | | | 375/219 |
| 2017/0318497 | A1 | 11/2017 | Tranquilli, Jr. |
| 2018/0287682 | A1* | 10/2018 | Kwak ............... H04B 7/0695 |
| 2019/0097678 | A1* | 3/2019 | Park ..................... H04L 1/0041 |
| 2019/0190595 | A1* | 6/2019 | Ching ................. H04B 7/2628 |
| 2019/0207731 | A1* | 7/2019 | Park ..................... H04W 16/28 |
| 2019/0312766 | A1* | 10/2019 | Sengupta ............ H04L 27/2602 |
| 2019/0334587 | A1* | 10/2019 | Rahman ............... H04B 7/0417 |
| 2019/0379437 | A1* | 12/2019 | Park ..................... H04L 27/2636 |
| 2020/0022168 | A1* | 1/2020 | Xu ........................ H04L 5/0053 |
| 2020/0052947 | A1* | 2/2020 | Sahin ................. H04W 72/0453 |

OTHER PUBLICATIONS

Harris et al., "Digital Receivers and Transmitters Using Polyphase Filter Banks for Wireless Communications" IEEE, Published Apr. 8, 2003, 40 pgs.

Harris et al., Orthogonal Waveforms and Filter Banks for Future Communication Systems, Chapter 6—"Filter banks for Software Defined Radio", https://www.sciencedirect.com/science/article/pii/B9780128103845000062; Published by Academic Press 2017, pp. 105-127.

International Search Report and Written Opinion issued in International Application No. PCT/US2020/054644, dated Dec. 16, 2020 in 20 pages.

U.S. Appl. No. 16/598,201, entitled " Channelizing a Wideband Waveform for Transmission on a Spectral Band Comprising Unavailable Channel Segments" (filed Oct. 10, 2019) (assigned to Viasat, Inc.).

International Search Report and Written Opinion issued in International Application No. PCT/US2020/054639 dated Jan. 29, 2021 in 11 pages.

Northrop Grumman, "Understanding voice and data link networking understanding voice and data link networking. Northrop Grumman's guide to secure tactical data links," Dec. 1, 2014, XP055559331, Retrieved from the Internet: http://www.northropgrumman.com/capabilities/datalinkprocessingandmanagement/documents/understanding _voice+data_link_networking.pdf.

* cited by examiner

CHANNELIZING AND BEAMFORMING A WIDEBAND WAVEFORM

BACKGROUND

The following relates generally to wideband communications, and more specifically to channelizing and beamforming a wideband waveform.

Wired and wireless communications systems are widely deployed to provide various types of communication content such as voice, video, packet data, messaging, broadcast, and so on. Some communications systems may be used in the context of secure communications, such as tactical communications. In addition, some communication systems may experience frequency-dependent interference. Such communications systems may be subject to various constraints and challenges.

SUMMARY

The described techniques relate to improved methods, systems, devices, and apparatuses that support channelizing and beamforming a wideband waveform. Generally, the described techniques provide for transmitting and receiving beamformed wideband waveforms. The described techniques may include techniques for transmitting a beamformed wideband waveform via a spectral band comprising unavailable channel segments. The techniques may include generating a set of segments of a first wideband waveform, mapping the set of segments to a set of channels, where each of the set of channels has a respective channel bandwidth, generating a set of copies of each segment of the set of mapped segments, where each copy of a respective segment is associated with a corresponding antenna of a set of antennas for a transmission, applying respective sets of beamforming coefficients to the set of copies for the mapped set of segments to obtain a set of component segments for each of the mapped set of segments, where the respective sets of beamforming coefficients for the mapped set of segments are based on channels of the set of channels for the mapping, combining the component segments associated with each of the set of antennas into respective component wideband waveforms, and transmitting each of the respective component wideband waveforms via a separate antenna of the set of antennas for the transmission.

The described techniques may include techniques for receiving, over a beamformed receive beam, a wideband waveform via a spectral band comprising unavailable channel segments. The techniques may include receiving a set of component wideband waveforms via a set of antennas, where each component wideband waveform is received via a separate antenna of the set of antennas, separating each component wideband waveform of the set of component wideband waveforms into a corresponding set of component segments, each segment associated with a corresponding channel of a set of channels, applying respective sets of beamforming coefficients to the component segments, and combining the beamformed component segments.

DETAILED DESCRIPTION

Figure 1:
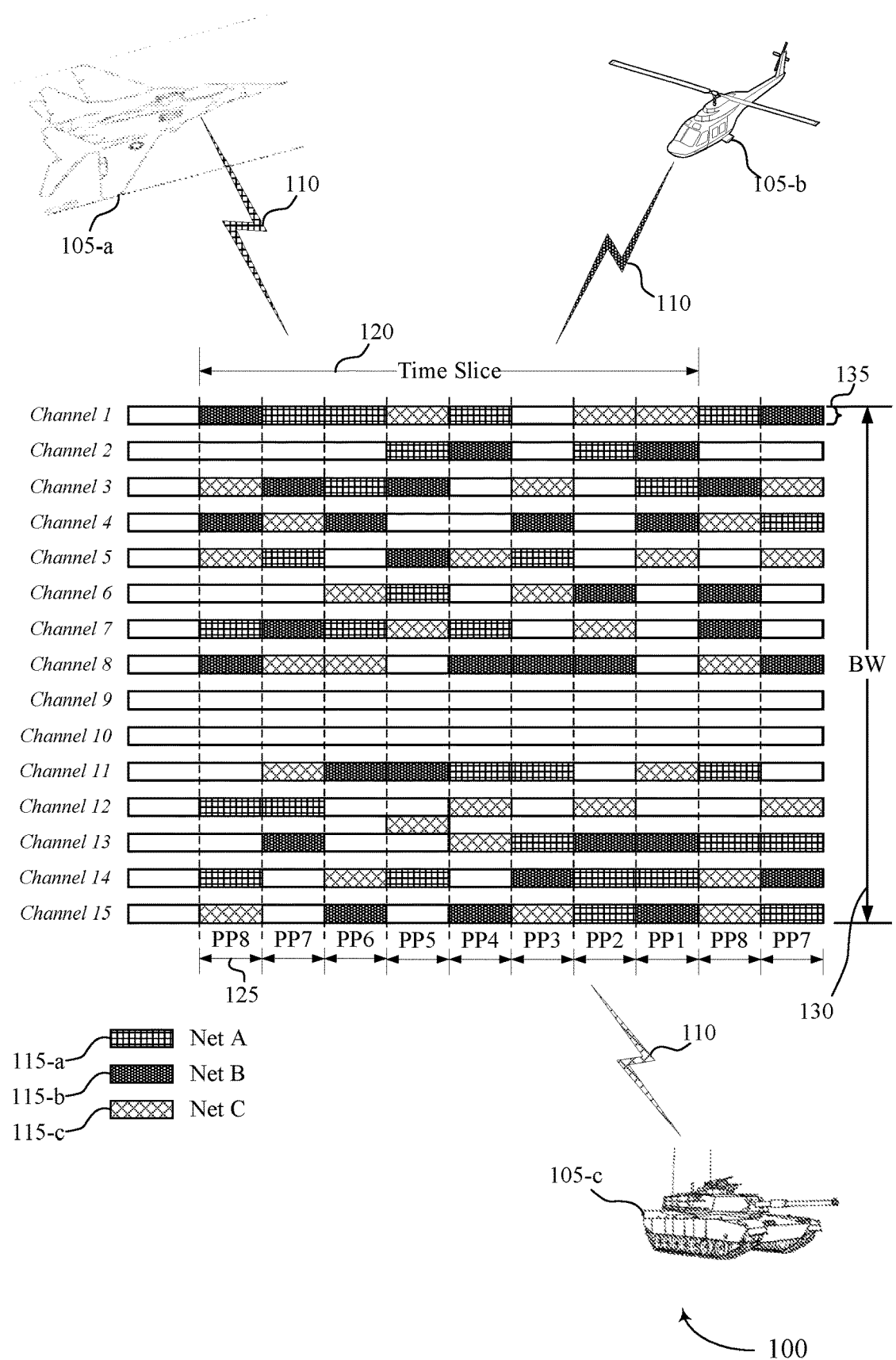
FIG. 1 illustrates an example of a wireless communication system that supports channelizing and beamforming a wideband waveform in accordance with aspects of the present disclosure.

Wireless communications systems used for secure communications, such as for tactical communications between military entities, may be subject to various constraints and challenges. For example, such communications may be expected to provide a high level of robustness to external tampering, a high level of reliability, etc. The Link 16 communication protocol is an example of a tactical data link that may provide various advantages for tactical communications, such as providing a relatively high level of security for transmissions. Link 16 was originally developed for tactical airborne air-to-air communications and supports voice communications and limited data communications. The spectrum used by Link 16 has been highly regulated, and the protocol was designed to support sparse waveforms that use relatively little spectrum. Tactical data links such as Link 16 may operate as primary user (e.g., prioritized over other users), a secondary user (e.g., a lower priority user than at least one other user), or as a tertiary user (e.g., as a user that obtains permission to use spectrum for transmission).

In recent years the use of Link 16 has expanded and the risks of jamming and other undesirable interference have increased. Because tactical data links such as Link 16 operate on older physical layers and under relatively tight regulation, however, increasing the capacity (e.g., throughput), spectrum efficiency, and security—particularly while maintaining backward compatibility—may be challenging.

Traditional data links may use single-channel transmission. In this case, if a particular transmission channel is jammed or otherwise unavailable for transmission, the transmitter may select a different channel if available. However, in single-channel transmissions, the transmission energy may be concentrated within the channel and may be more easily detectible or jammable. A transmitter may provide better anti-jamming performance, better throughput, and/or better spectrum efficiency by generating a wideband waveform representing the data to be transmitted and mapping the wideband waveform to multiple channels. In this case, the information may be spread across multiple channels to reduce detectability of the signal, improve transmission quality and throughput, and mitigate the effect of channel jamming.

In some cases, a waveform may be beamformed and transmitted using multiple antennas to increase signal quality. However, beamforming is typically a narrow band process. As the transmit frequency moves away from a beamformer's design frequency, the beam shape degrades. This may be a minor problem for narrowband systems such as WiFi or cellular telephony, but may be a more serious problem in a wideband system such as tactical systems or other systems described herein. That is, beamforming a wideband waveform may be more challenging than beamforming a narrowband waveform.

As described herein, a transmitter may be configured to beamform a wideband waveform on a per-channel basis before transmission. For example, in some cases, a transmitter may segment a first wideband waveform into multiple segments, where each segment may correspond to a channel of a system bandwidth. The transmitter may generate multiple copies of each segment to create multiple sets of segments, where each set of segments may correspond to an antenna for transmission. The transmitter may beamform the sets of segments on a per-channel basis, then combine the beamformed sets of segments into multiple (second) wideband waveforms for transmission. The transmitter may transmit each of the second wideband waveforms using a separate antenna.

Aspects of the disclosure are initially described in the context of a wireless communications system. Aspects of the disclosure are further illustrated by and described with reference to apparatus diagrams, system diagrams, and flowcharts that relate to channelizing and beamforming a wideband waveform.

FIG. 1 illustrates an example of a communication system 100 that may employ channelizing and beamforming a wideband waveform, according to various aspects of the disclosure. Communication system 100 includes devices 105 that may be capable of wireless communication using a tactical data link 110. Devices 105 may be a handheld device carried by a user, or may be located in a vehicle such as aircraft, tank, ship, or other type of vehicle. Tactical data link 110 may support secure communications between devices 105 and may include frequency hopping capabilities. Frequency hopping may refer to rapidly switching a carrier among different frequency channels using a sequence (e.g., a pseudorandom sequence) known to both transmitter and receiver. For example, tactical data link 110 may support frequency hopping at 13 microsecond intervals or at other relatively short intervals.

Tactical data link 110 may enable devices 105 to communicate on a system bandwidth that includes multiple channels having predetermined bandwidths (e.g., each channel having the same bandwidth). In some cases, not all of the channels may be available for transmission. For example, in some cases tactical data link 110 may transmit on a data link network platform having a spectral band (e.g., a system bandwidth) comprising N bandwidth segments (e.g., channels) only M of which may be available at any given time. In some cases, a tactical data link 110 may have a spectral band of 240 MHz (e.g., a band that ranges from 967.5 to 1207.5 MHz), where N is 80 channels each comprising 3 MHz and M is 51 or less.

In some cases, tactical data link 110 may be a time division multiple access (TDMA) platform in which each user is assigned one or more time slices in which to transmit. A transmitting user may transmit a message as a sequence of encoded pulses, which are frequency-hopped in a unique hopping pattern among the channels within a time slice. In some cases, each pulse may have a bandwidth equal to a channel bandwidth, and may be mapped to one of the channels according to the hopping pattern. In some cases, the hopping pattern is known to the receiving user. Use of hopping patterns may allow multiple users to transmit in the same time slice. In some cases, each user transmitting in the same time slice but using a different hopping pattern may be referred to as transmitting on a different "net." In some cases, transmissions may include parallel pulses on each available channel. However, if one or more channels on which the pulses are mapped is jammed or has substantial interference, the link performance may degrade substantially.

A transmitter used in a system for transmitting wideband waveforms over a tactical data link may receive a stream of bits for transmission (e.g., from a processor in the system), and may generate a wideband waveform based on the stream of bits. In some cases, the system may be configured to transmit wideband waveforms using a system bandwidth that may include or may be partitioned into multiple channels, where each channel may have a predetermined (e.g., the same) channel bandwidth.

According to various aspects of the disclosure, a transmitter may enhance performance over a segmented spectral band by generating a wideband waveform representing the data to be transmitted and mapping the wideband waveform to multiple channels. The transmitter may make multiple copies of the channelized wideband waveform, and may beamform each copy on a per-channel basis. Channelizing and beamforming the wideband waveform may provide better anti jamming performance, better throughput, and/or better spectrum efficiency. For example, the information may be spread across multiple channels to reduce detectability of the signal, improve transmission quality and throughput, and mitigate the effect of channel jamming.

FIG. 1 illustrates a system bandwidth 130 including 15 channels with three devices 105 transmitting over three different nets 115 of tactical data link 110 during a time slice 120. For example, a first device 105-*a* may transmit over net A 115-*a*, a second device 105-*b* may transmit over net B 115-*b*, and a third device 105-*c* may transmit over net C 115-*c*. Each of the devices may concurrently receive or listen to one or more nets 115. For example, device 105-*a* may transmit over net 115-*a* while receiving net B 115-*b* and net C 115-*c*. Alternatively, some devices 105 may only transmit or receive during a given time slice 120. First device 105-*a* may transmit using three channels 135 during each pulse period 125 in time slice 120, where the channels 135 used by first device 105-*a* for each pulse period 125 of time slice 120 may be determined by the hopping pattern associated with net A 115-*a*. For each time slice 120, device 105-*a* may determine an available subset of the system bandwidth 130. For example, device 105-*a* may determine a number of channels that are configured for net A 115-*a* for time slice 120. Additionally or alternatively, device 105-*a* may determine a subset of channels 135 available for the time slice 120, which may be based on a configuration for the system bandwidth (e.g., for one or more time slices 120). In addition, one or more channels 135 may be unavailable due to interference (e.g., jamming). For example, device 115-a may be configured to use three channels 135 per pulse period 125 of time slice 120, and may determine that 13 of the 15 channels of the system bandwidth are available for time slice 120. In addition, device 105-a may determine that one or more channels 135 have an interference level that meets or exceeds a threshold. In one example, device 105-a may determine that channels 7 and 8 have excessive interference during time slice 120. Device 105-a may be mapped to different subsets (e.g., provisional subsets) of three channels 135 per pulse period 125. For each pulse period 125 where net A 115-a is mapped to one or more of channels 7 and 8, device 105-a may allocate transmission power to the other channels associated with the pulse period 125. For example, for pulse periods 8, 6, and 4 of time slice 120, device 105-a may allocate its transmission power between the other two channels 135 (e.g., allocating zero power to channels 7 and 8), while in the other pulse periods device 105-a may allocate its transmission power between three channels 135. In some cases, devices 105 may make a determination of available channels on a pulse period 125 basis. For example, device 105-a may receive or identify an indication of a provisional subset of channels for a given pulse period 125, and may make a determination of the available channels of the provisional subset of channels (e.g., based on interference).

Although illustrated as having 15 total channels, tactical data link 110 may have any number of channels, and an arbitrary number up to and including all of the total number of channels may be available for each time slice 120. Each net 115 may also be associated with varying numbers of channels for each pulse period, up to and including the number of available channels. Although nets A, B, and C are illustrated in FIG. 1 as having non-overlapping hopping patterns, hopping patterns for nets 115 may overlap during one or more pulse periods 125 of a time slice 120, in some cases. Although FIG. 1 depicts three pulses (e.g., on three channels 135) on each net 115 per pulse period 125, in some cases, tactical data link 110 may support a different number of pulses on each net 115, such as one pulse per net 115 per pulse period 125.

Figure 2:
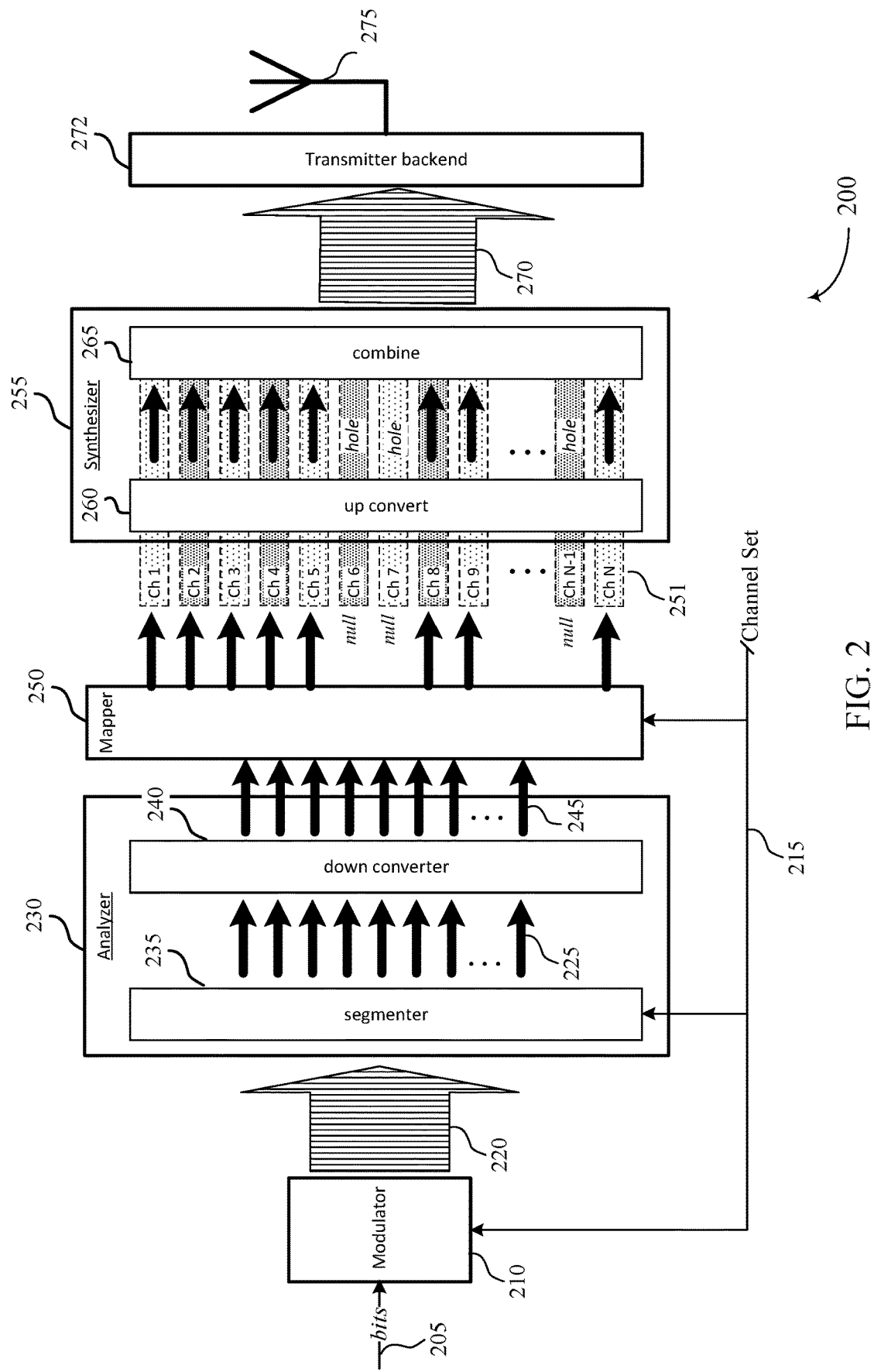
FIG. 2 illustrates an example of a transmitter that supports channelizing and beamforming a wideband waveform in accordance with aspects of the present disclosure.

FIG. 2 illustrates an example of a transmitter 200 that supports channelizing and beamforming a wideband waveform in accordance with aspects of the present disclosure. In some examples, transmitter 200 may be included in a wireless communication system, such as wireless communication system 100.

Transmitter 200 may be configured to wirelessly transmit wideband waveforms over a tactical data link using one or more antennas 275 and a transmitter backend 272. In some cases, a wideband waveform may be a waveform that spans a relatively wide band of frequencies, and may be a spread spectrum waveform. Transmitter 200 may be configured to transmit wideband waveforms using a system bandwidth, which may be a band of frequencies over which transmitter 200 may transmit signals. In some cases, a system bandwidth may be partitioned into channels, with each channel having a respective bandwidth (e.g., the same channel bandwidth). In some cases, one or more channels of the system bandwidth may be unavailable for transmissions if, for example, the channels are excluded from a subset of configured available channels or are jammed by interfering signals (e.g., other transmissions or intentional jamming). In some cases, transmitter 200 may identify a channel set 215 (e.g., a set of channels selected for transmission) and may transmit wideband waveforms using the channel set 215, as described in more detail herein. In some examples, the channel set 215 may correspond to all of the available channels, while in some cases channel set 215 may be a subset of the available channels (e.g., a configured number of channels). In some cases channel set 215 may be determined by excluding channels from the available channels or configured channels that have a level of signal power (e.g., interference) that satisfies (e.g., meets or exceeds) a threshold.

In operation, transmitter 200 may receive a stream of bits 205, such as data bits for transmission. In some cases, the stream of bits 205 may be received for transmission in a time period (e.g., a pulse period). In some cases, transmitter 200 may receive the stream of bits 205 from a processor or other device that is coupled with transmitter 200. Transmitter 200 may include a modulator 210 for modulating the stream of bits 205 to generate a first wideband waveform 220. In some cases, modulator 210 may receive an indication of channel set 215, and may modulate the stream of bits 205 based on the number of channels in channel set 215. For example, a device that includes transmitter 200 may identify a total number of channels of a system bandwidth and a set of available channels for a time slice or pulse period (e.g., configured for the time slice or pulse period, or having a signal power level that does not satisfy a threshold). The device may determine channel set 215 from the set of available channels (e.g., a subset or all of the set of available channels).

In some cases, channel set 215 may exclude channels that have signal power satisfying the threshold (e.g., due to excessive use or intentional jamming). In some cases, the channel set 215 may be non-contiguous; that is, at least two channels in the channel set 215 may be separated by one or more channels that are excluded from the channel set 215.

In some cases, the modulator 210 may modulate the stream of bits 205 to generate a first wideband waveform 220 having a bandwidth that is equal to an aggregate bandwidth of the channels in the channel set 215. For example, where the bandwidth of the channels is the same, the bandwidth of first wideband waveform 220 may be determined by the number of channels in channel set 215 multiplied by the channel bandwidth. In one example, transmitter 200 may be configured to transmit via M segments, each segment having a bandwidth of B MHz. Thus, the bandwidth of the first wideband waveform may be equal to M·B MHz. Where the bandwidths of the channels are not the same, the bandwidth of first wideband waveform 220 may be determined by summing the bandwidths of the channels in channel set 215.

In some cases, modulator 210 may be a variable modulator that may select a modulation scheme (e.g., from a set of modulation schemes) for modulating the stream of bits 205 based on various factors. For example, modulator 210 may select a modulation scheme based on the channel set 215 and/or on a desired coding rate, block error rate (BLER), or throughput. In some cases, the modulation scheme may specify, for example, a modulation type (e.g. BPSK, QPSK, 16 QAM, etc.), a type of code (e.g., convolutional code, LDPC code), and a code rate (e.g., a rate 1/3 code, a rate 5/8 code).

Transmitter 200 includes analyzer 230. Analyzer 230 includes segmenter 235 for separating the first wideband waveform 220 into multiple segments 225. Segments 225 may have respective bandwidths corresponding to channel bandwidths of the channel set 215 (e.g., the same bandwidth). In some cases, segmenter 235 may separate the first wideband waveform 220 into segments 225 by applying multiple filters (such as bandpass filters (BPFs)) to the first wideband waveform 220. In some cases, segmenter 235 may include a series of filters to separate first wideband waveform 220 into segments 225, and may be implemented using a polyphase filter. Each segment 225 may have an effective symbol timing that is less (e.g., substantially less) than the symbol timing (e.g., pulse period). That is, each segment 225 may carry information associated with multiple symbols in each symbol period or pulse period.

In some cases, analyzer 230 includes downconverter 240 to downconvert the segments 225 to baseband segments 245 For example, segments 225 may each be associated with different frequency ranges and downconverter 240 may downconvert each segment to a baseband frequency range.

Transmitter 200 includes mapper 250 for mapping the segments (e.g., baseband segments 245) to the corresponding frequency ranges of channel set 215. In some cases, the remaining channels (e.g., channels of the system bandwidth that are not in channel set 215) may be set to null values. For example, mapper 250 may output a null segment or null signal for channels of the system bandwidth that are not in channel set 215. A null segment may be a signal having no signal energy within the baseband frequency range.

Mapper 250 may map segments 225 to channel set 215 in an order of the segments 225. Alternatively, mapper 250 may scramble an order of the segments 225 among channel set 215 such that the segments 225 are mapped to channel set 215 out of order relative to the order of the segments, as depicted in FIG. 2. For example, adjacent segments may not be mapped to adjacent channels of channel set 215. Where a scrambled order is used, mapping of non-adjacent segments to adjacent channels of channel set 215 may cause aliasing of signal energy from adjacent segments at the receiver. Thus, groups of segments may be mapped to contiguous blocks of channels of channel set 215. That is, groups of contiguous blocks of channel set 215 may be identified, and sub-groups of contiguous segments 225 may be mapped to each of the groups of contiguous blocks. Mapper 250 may output mapped segments 251 to synthesizer 255.

In some examples, mapper 250 may perform additional processing. For example, mapper 250 may perform multipath equalization of segments 225 or mapped segments 251 before outputting mapped segments 251.

Transmitter 200 includes synthesizer 255 for generating a second wideband waveform 270. Synthesizer 255 includes upconverter 260 for upconverting the mapped segments to higher frequencies. Synthesizer 255 includes combiner 265 for combining the upconverted segments and holes in the spectrum (corresponding to the null values) into a second wideband waveform 270 having a bandwidth corresponding to the channel set 215 (e.g., extending from a first channel of channel set 215 having a lowest frequency to a second channel of channel set 215 having a highest frequency). Second wideband waveform 270 may have a bandwidth that is wider than first wideband waveform 220. Second wideband waveform may include null frequency ranges (e.g., corresponding to frequency channels of the system bandwidth that are not in channel set 215).

In some cases, by generating the second wideband waveform 270 as described herein, the energy of each bit of the stream of bits 205 may be spread over the channels in second wideband waveform 270 and may therefore be less susceptible to data loss due to jamming of a single channel.

In some cases, transmitter 200 may include a transmitter backend 272 that includes hardware or software to implement additional processing on second wideband waveform 270 before transmission using one or more antennas 275. For example, the second wideband waveform 270 may be upconverted to passband before transmission.

In some cases, the transmitted signal (e.g., the transmitted second wideband waveform) will carry the information in the first wideband waveform that is output by the modulator, but there may be substantial energy only in the channels of channel set 215. In this case, the transmitted signal may not interfere with signals transmitted (e.g., by other transmitters) in the other channels of the system bandwidth.

In one example, a system bandwidth of 45 MHz may be configured with 3 MHz channels (e.g., 15 channels). Transmitter 200 may identify a channel set 215 for a first time period (e.g., a first pulse period) that includes channels 1-5, 8-10, 13, and 15 (e.g., including 10 of the 15 channels). Modulator 210 may generate a first wideband waveform 220 having a bandwidth of 30 MHz and analyzer 230 may segment and downconvert each segment to generate 10 baseband segments 245, each representing a portion (e.g., 3 MHz) of the 30 MHz bandwidth, and each having a baseband frequency range of 0-3 MHz. Mapper 250 may map the baseband segments 245 to the channel set 215, and may map null waveforms to channels of the system bandwidth not in channel set 215. Mapper 250 may map the baseband segments 245 to channel set 215 in order, or mapper 250 may map the baseband segments 245 to channel set 215 in a scrambled order. For example, mapper 250 may map baseband segment 1 to channel 13, baseband segments 2-4 to channels 8-10, baseband segments 5-9 to channels 1-5, and baseband segment 10 to channel 15. Synthesizer 255 may upconvert the mapped segments 251 to corresponding frequencies of channel set 215 and combine the upconverted segments to obtain a second wideband waveform 270. In this example, second wideband waveform 270 may have a bandwidth of 45 MHz, with substantially no signal energy in channels 6, 7, 11, 12, and 14. In instances where channel set 215 does not include channel 1 or channel 15, second wideband waveform 270 may have a bandwidth of less than the system bandwidth of 45 MHz (e.g., where one or more segments are not mapped to the upper or lower channels of the system bandwidth).

Transmitter 200 may identify a new channel set 215 for a second time period (e.g., a second pulse period), and may perform the segmenting, downconverting, mapping, upconverting, and combining to generate a second wideband waveform 270 for the second time period. For example, transmitter 200 may identify a new channel set 215 every pulse period, or every fourth, eighth, or twelfth pulse period, or every time slice, or at some other time period. New channel set 215 may be different than the channel set 215 for the first pulse period and may or may not have any channels in common with the previous channel set 215. For example, new channel set 215 may have the same or a different number of channels. It should be understood that this example is provided for the sake of clarity, and other system bandwidths and channel bandwidths are contemplated without deviating from the scope of the application. For example, the system bandwidth may be 240 MHz, and the system may have 80 channels where each channel has a 3 MHz channel bandwidth. Channel set 215 may have up to 51 channels in each pulse period and thus first wideband waveform 220 may have a bandwidth of up to 153 MHz while second wideband waveform 270 may have a bandwidth of up to 240 MHz (e.g., the system bandwidth).

Figure 6:
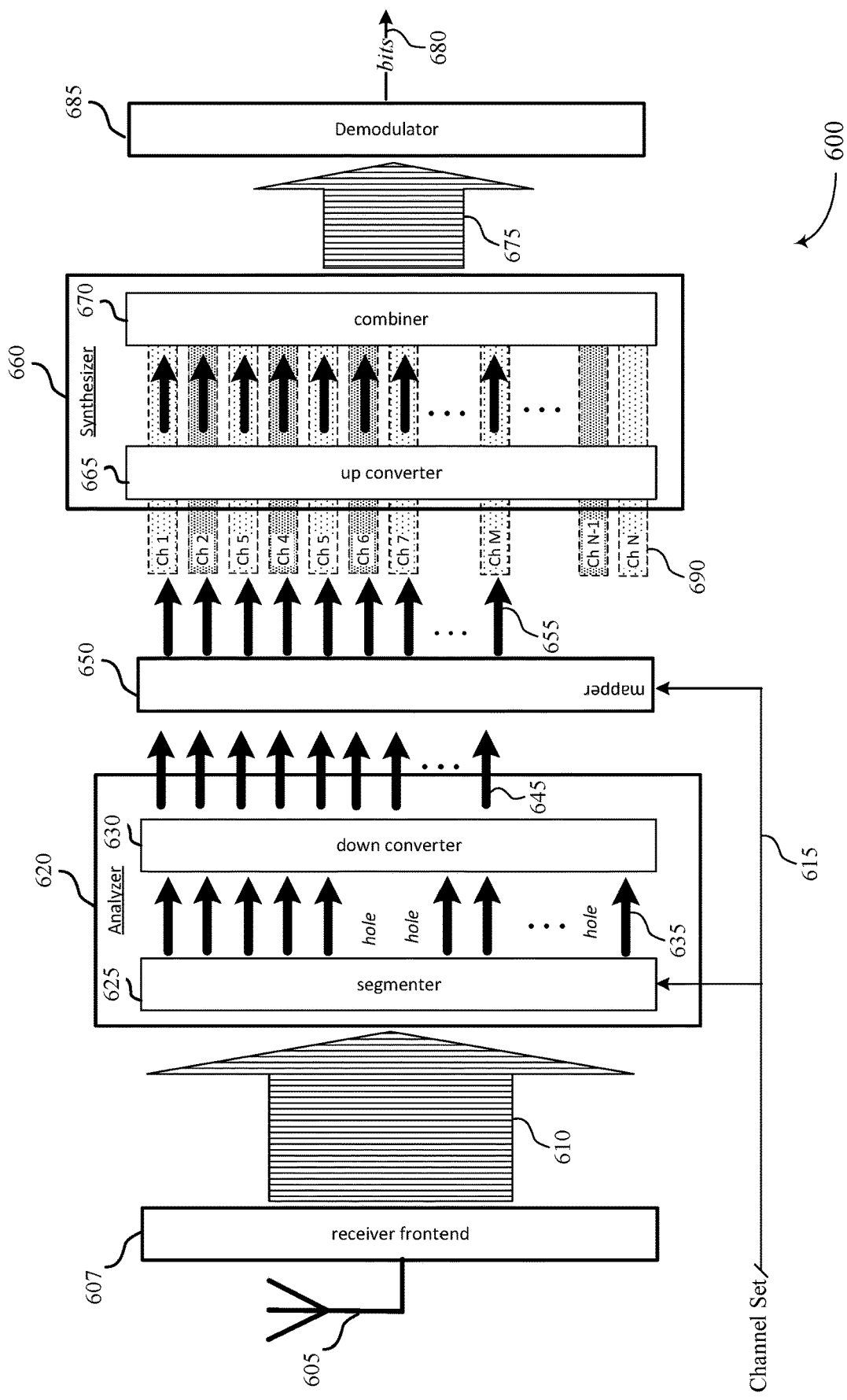
FIG. 6 illustrates an example of a receiver that supports channelizing and beamforming a wideband waveform in accordance with aspects of the present disclosure.
Figure 7:
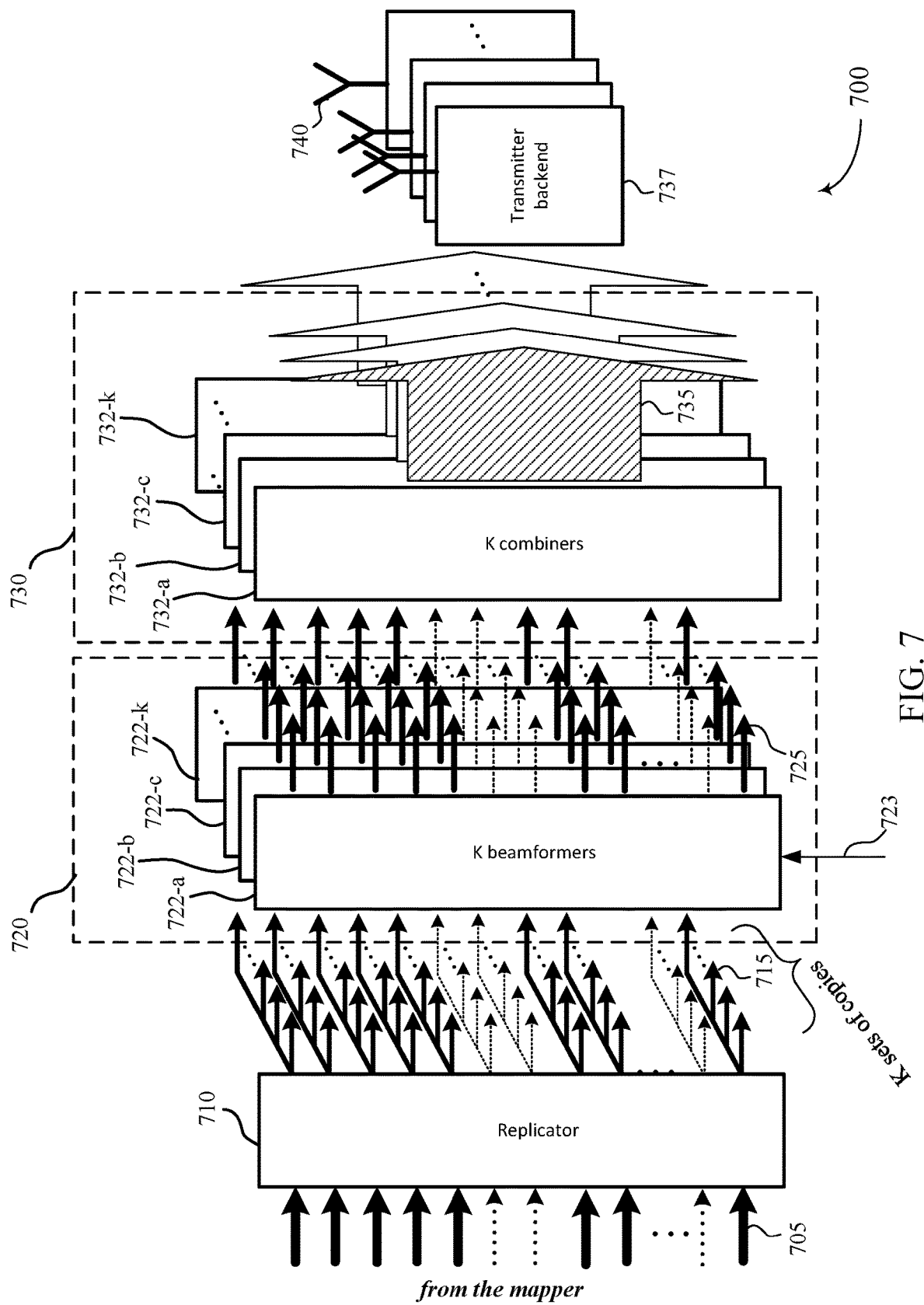
FIG. 7 illustrates an example of a portion of a transmitter that supports channelizing and beamforming a wideband waveform in accordance with aspects of the present disclosure.

In some cases, transmitter 200 may beamform the second wideband waveform 270. For example, transmitter 200 may include multiple antennas 275 upon which multiple component versions of the second wideband waveform 275 may be transmitted, resulting in a beamformed transmission. The set of segments and nulls processed by the synthesizer 255 can be replicated into as many copies as there are antennas 275. Beamforming processing can be applied to each replicated set of the segments and nulls so each set forms one of the component versions of the second wideband waveform 270 transmitted on one of the antennas 275. In one example, the segments and nulls can be replicated and the beamforming processing applied to the segments and nulls output by the mapper 250, such as depicted in the example of FIG. 7. In some cases, the segments and nulls can be replicated and the beamforming processing applied to the segments and nulls within the synthesizer 660 (e.g., as output by the upconverter 665) as depicted in FIG. 6.

Figure 3:
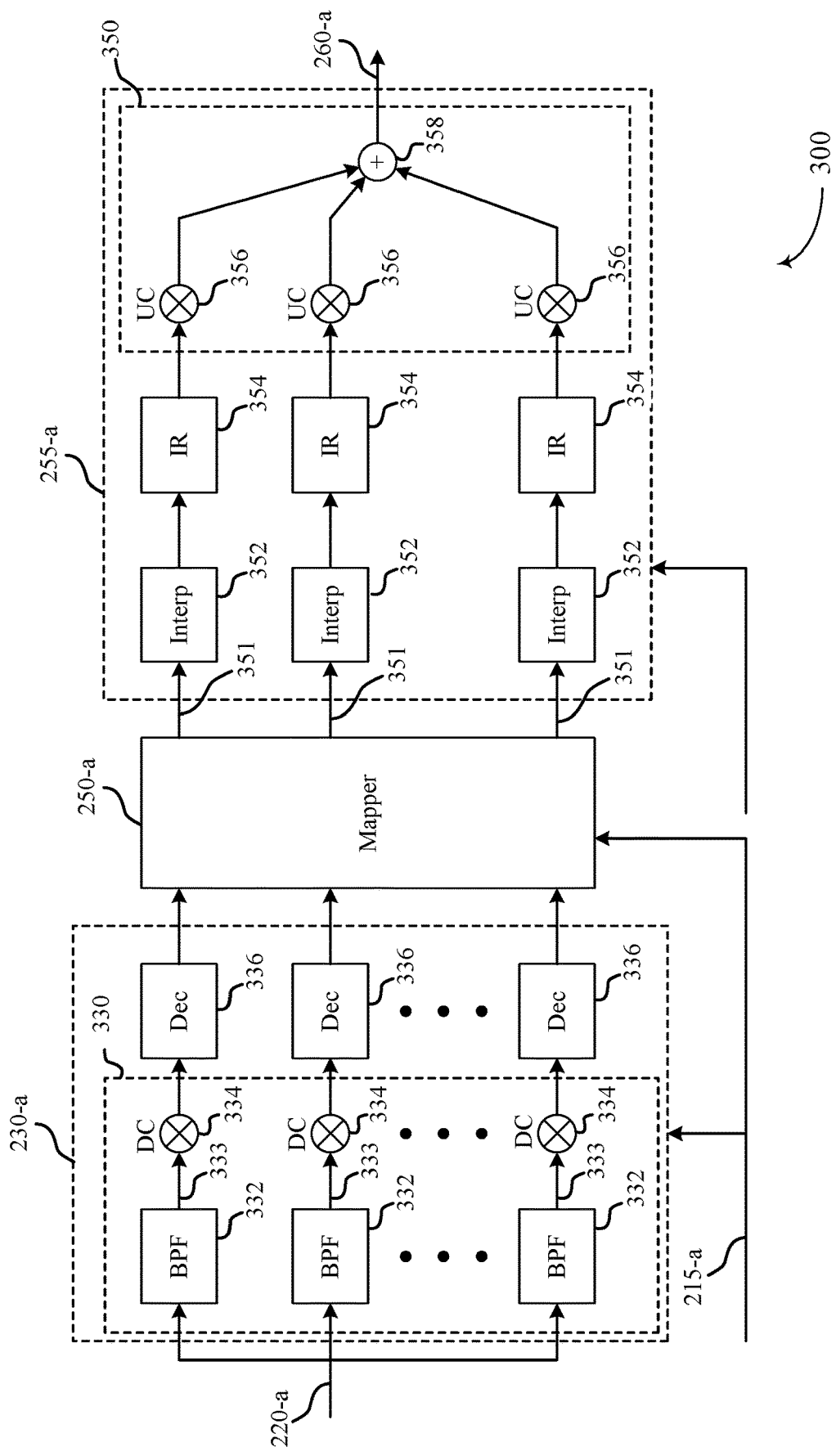
FIG. 3 illustrates an example of a transmitter that supports channelizing and beamforming a wideband waveform in accordance with aspects of the present disclosure.

FIG. 3 illustrates an example of a portion of a transmitter 300 that supports channelizing and beamforming a wideband waveform in accordance with aspects of the present disclosure. In some examples, transmitter 300 may implement aspects of wireless communication system 100 or transmitter 200.

Transmitter 300 includes analyzer 230-a, mapper 250-a, and synthesizer 255-a, which may be examples of analyzer 230, mapper 250, and synthesizer 255 of FIG. 2, respectively. A first wideband waveform 220-a may be input to analyzer 230-a. Analyzer 230-a includes multiple bandpass filters 332, downconverters (DCs) 334, and decimators 336. Band-pass filters 332 may each be associated with a frequency range of the first wideband waveform 220-a. For example, the first wideband waveform 220-a may have a bandwidth corresponding to an aggregate bandwidth of a number of segments in a channel set 215-a configured for transmission within a pulse period. In one example, transmitter 300 may be configured to transmit via M segments, each segment having a bandwidth of B MHz. In this case, analyzer 230-a may have M (or more) bandpass filters 332, each configured to pass a range of frequencies corresponding to the bandwidth of one segment. That is, bandpass filters 332 may be configured to pass frequencies in ranges of $\{0 \text{ to } B\}$, $\{B \text{ to } 2B\}$, ... $\{(M-1)*B \text{ to } M*B\}$. Bandpass filters 332 may output filtered segment waveforms 333.

Downconverters 234 may downconvert filtered segment waveforms 333 to a baseband frequency range. For example, downconverters 234 may downconvert each filtered segment waveform 333 to have a frequency range of $\{0 \text{ to } B\}$. Decimators 336 may decimate (e.g., downsample) the downconverted filtered segment waveforms 333 from a first sample rate associated with the first wideband waveform 220-a to a second, lower sample rate (e.g., which may not cause aliasing because of the smaller bandwidth of each segment). In some cases, bandpass filters 332 and downconverters 334 may be implemented in a downconverting filter 330. Downconverting filter 330 may implement bandpass filters 332 using a polyphase filter an inverse discrete Fourier transform (IDFT). In some cases, both the inputs and the outputs of the IDFT are in the time domain. It should be understood that the IDFT may be implemented using an inverse fast Fourier transform (IFFT) algorithm, and the terms IDFT and IFFT may be used interchangeably.

Mapper 250-a may map the downconverted filtered segment waveforms 333 to segments of a channel set (e.g., channel set 215-a). Mapper 250-a may map downconverted filtered segment waveforms 333 to the segments in order of the downconverted filtered segment waveforms 333. Alternatively, mapper 250-a may map the downconverted filtered segment waveforms 333 to the segments of the channel set using a scrambled mapping (e.g., not in order). Mapper 250-a outputs mapped segment waveforms 351, each mapped segment waveform 351 being a baseband waveform sampled according to a baseband sampling frequency. Mapper 250-a may output M mapped segment waveforms 351, where M corresponds to a number of segments in channel set 215-a (e.g., null segments may not correspond to a mapped segment waveform 351).

Synthesizer 255-a includes interpolators 352, image rejection (IR) filters 354, upconverters 356, and combiner 358. Interpolators 352 effectively upsample the mapped segment waveforms 351 by interpolating from the second sample rate to a third, higher sample rate (e.g., a sample rate associated with a system bandwidth). For example, interpolators 352 may upsample the mapped segment waveforms 351 to a sample rate that is based on an aggregate bandwidth of a total number of channels of the system bandwidth (e.g., a sample rate that satisfies the Nyquist criteria for the system bandwidth).

Image rejection filters 354 may perform filtering to suppress image spectra that may result from interpolation.

Upconverters 356 upconvert each mapped segment waveform 351 to a frequency of the channel set 215-a. For example, a first upconverter 356 may upconvert a first mapped segment waveform 351 to a frequency of a first channel of the channel set 215-a, a second upconverter 356 may upconvert a second mapped segment waveform 351 to a frequency of a second channel of the channel set 215-a, and so on, such that each of the mapped segment waveforms 351 are upconverted to respective channels of the channel set 215-a. Combiner 358 combines the upconverted mapped segment waveforms 351 to obtain second wideband waveform 270-a, which may include signal energy in channels of a system bandwidth corresponding to channel set 215-a, and null waveforms (e.g., substantially no signal energy) in channels of the system bandwidth not within channel set 215-a. Upconverters 356 and combiner 358 may be implemented as upconverting filter 350. In some cases upconverting filter 350 may implement upconverters 356 and combiner 358 using a polyphase filter and an inverse DFT.

Figure 4:
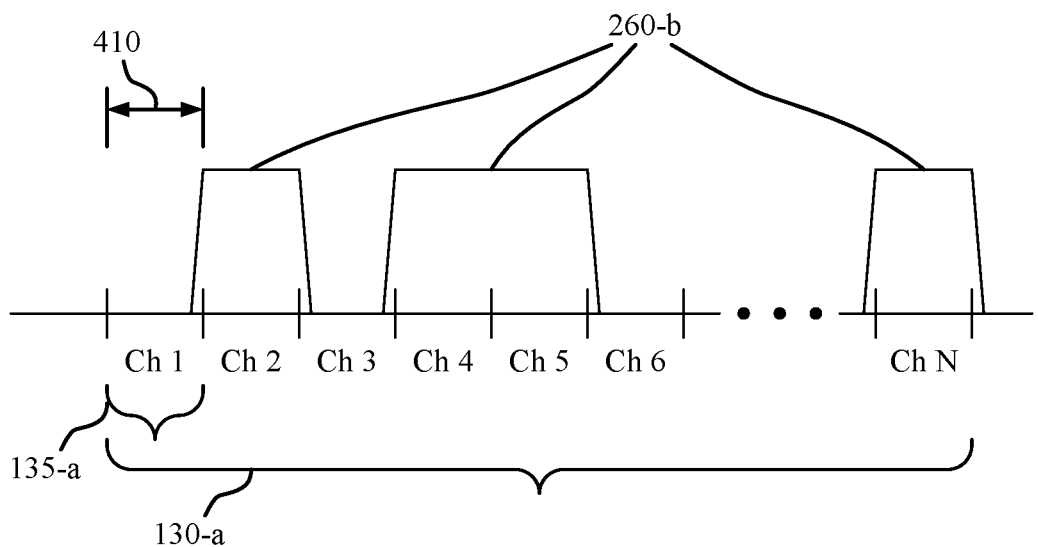
FIG. 4 illustrates an example of a spectrum plot that supports channelizing a wideband waveform for transmission on a spectral band comprising unavailable channel segments in accordance with aspects of the present disclosure.

FIG. 4 illustrates a spectrum plot 400 of a channelized wideband waveform for transmission on a spectral band comprising unavailable channel segments in accordance with aspects of the present disclosure. Spectrum plot 400 shows, for example, a system bandwidth 130-a that includes N channels 135-a. Each channel 135-a may have a channel bandwidth 410. Although FIG. 4 illustrates channels 135-a having the same channel bandwidth 410, channels 135-a may have different bandwidths, in some cases. In some examples, implementations using a polyphase synthesis bank or a polyphase analysis bank may be applied in environments where each channel 135 has the same channel bandwidth 135-a, or are powers of two or multiples of a power of two relative to each other.

Spectrum plot 400 illustrates spectrum of a second wideband waveform 270-b, which may be generated, for example, by the transmitters 200 or 300 of FIG. 2 or 3. Second wideband waveform 270-b may include signal power within channels 135-a of a channel set, while channels that are not included in the channel set may not have substantial signal power (e.g., may have null waveforms). For example, FIG. 4 illustrates that second wideband waveform 270-b has signal power in channels 2, 4, 5, and N (with some channels not shown for the sake of clarity), while channels 1, 3, and 6 have null signals (e.g., substantially no signal power). The bandwidth of the signal power of second wideband waveform 270-b for each channel 135-a may be understood as the range of the spectral density of the channel 135-a that includes signal power over a threshold (e.g., 3 dB, 6 dB). In some cases, the signal power waveform for each segment may have a guardband (e.g., a segment of 3 MHz may have guardbands of 100 KHz, or a 3 dB bandwidth of 2.8 MHz).

Figure 5A:
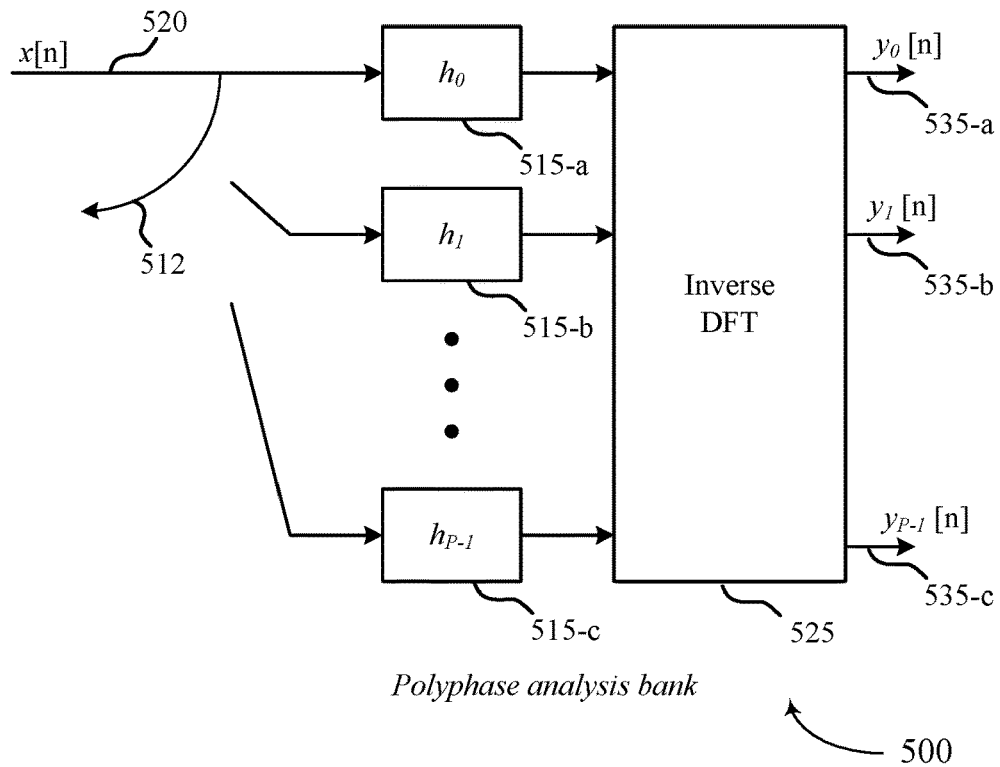
FIGS. 5A and 5B illustrate an example of a polyphase analysis bank and an example of a polyphase synthesis bank that support channelizing and beamforming a wideband waveform in accordance with aspects of the present disclosure.
Figure 5B:
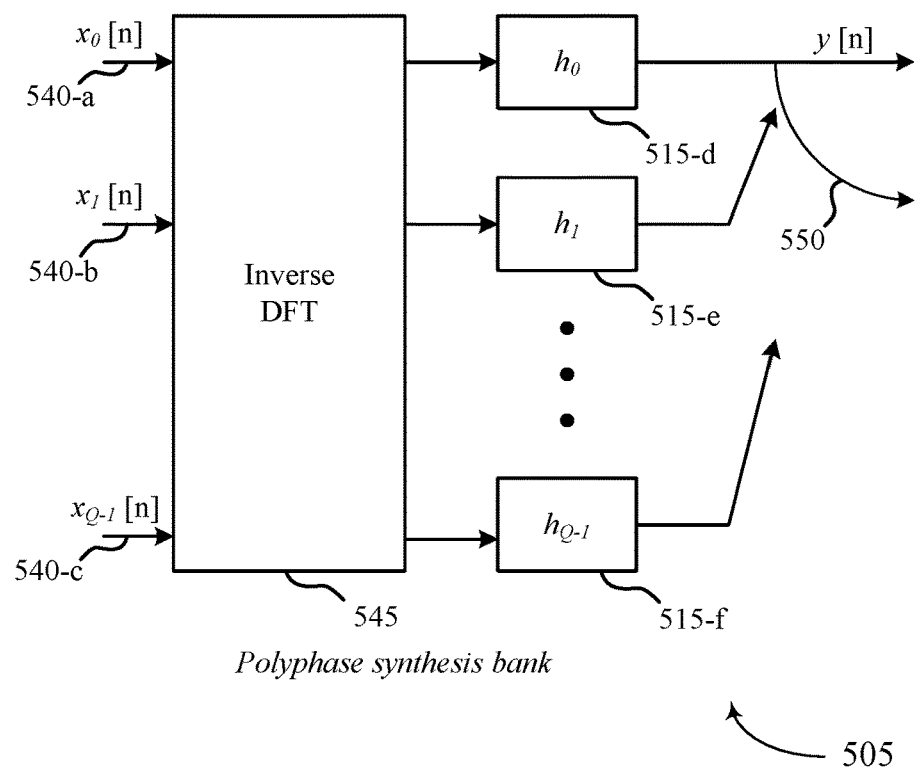

FIGS. 5A and 5B illustrate examples of polyphase analysis bank 500 and a polyphase synthesis bank 505 that support channelizing and beamforming a wideband waveform in accordance with aspects of the present disclosure. In some examples, polyphase analysis bank 500 and polyphase synthesis bank 505 may implement aspects of wireless communication system 100.

Polyphase analysis bank 500 includes multiple polyphase filters. For example polyphase analysis bank 500 is illustrated with P subfilters 515 and IDFT 525. Each subfilter 515 may have the same or different orders. An input signal 520 (e.g., first wideband waveform 220) may be input to subfilters 515 (e.g., different sample interlaces may be input to subfilters 515 by commutator 512) and the output of the subfilters 515 may be input to inverse DFT 525. Each subfilter 515 may receive an interlaced subset of samples of the input signal 520. For example, subfilters 515-a, 515-b, and 515-c may each receive different subsets of samples of the input signal 520. In some cases, commutator 512, subfilters 515, and IDFT 525 may implement a downconversion polyphase filter that outputs downconverted filtered waveform segments 535. For example, commutator 512 may downsample the input signal 520, subfilters 512 may perform filtering, and IDFT 525 may perform downconversion. Polyphase analysis bank 500 may be an example of a downconverting filter 330.

Polyphase synthesis bank 505 may also include multiple polyphase filters. For example polyphase synthesis bank 505 is illustrated with IDFT 545 and Q subfilters 515. Each subfilter 515 (e.g., subfilters 515-d, 515-e, 515-f and others) may have the same or different orders. Inverse DFT 545 may receive Q input signals (e.g., mapped segments 251) and output Q signals to subfilters 515. IDFT 545 and subfilters 515 may perform filtering and upconversion to generate an upconverted waveform combining the signal energy within the Q signals (e.g., corresponding to Q segments). For example, the output of subfilters 515 may be combined by commutator 550 (e.g., by interlacing samples from the Q subfilters) to obtain the upconverted waveform (e.g., second wideband waveform 270). That is, IDFT 545 may perform upconversion, subfilters 515 may perform image reject filtering, and commutator 550 may perform upsampling. Polyphase synthesis bank 505 may be an example of an upconverting filter 350.

FIG. 6 illustrates an example of a receiver 600 that supports channelizing and beamforming a wideband waveform in accordance with aspects of the present disclosure. In some examples, receiver 600 may be included in a wireless communication system, such as wireless communication system 100.

Receiver 600 may be configured to wirelessly receive wideband waveforms over a tactical data link using one or more antennas 605. Receiver 600 may be configured to receive a first wideband waveform 610 via a system bandwidth, which may be a band of frequencies over which receiver 600 may receive signals. In some cases, a system bandwidth may be partitioned into channels, with each channel having a respective bandwidth (e.g., the same channel bandwidth).

In some cases, one or more channels of the system bandwidth of the first wideband waveform 610 may be unused for a received signal (e.g., via a "net" of a tactical data link). Unused channels of the system bandwidth may not include data to be received and/or may have a received level of signal power (e.g., signal energy) that is below a threshold. That is, in some cases, there may be substantial energy of the received signal only in a subset of channels of the channels of the system bandwidth. In some cases, the subset of channels may be non-contiguous; that is, at least two channels in the subset of channels may be separated by one or more channels that are excluded from the subset of channels. In some cases, receiver 600 identifies that a level of signal power for at least one of the channels of the system bandwidth satisfies a threshold (e.g., is below a minimum), and excludes such channel(s) from the subset of channels 615. Receiver 600 may identify or receive an indication of the subset of channels of the system bandwidth associated with a signal for reception (e.g., channel set 615).

In some cases, receiver 600 may include a receiver frontend 607 that includes hardware or software to process a signal received using antenna(s) 605 to generate first wideband waveform 610. For example, receiver frontend 607 may filter the received signal, mix the signal (e.g., downconvert), perform analog-to-digital conversion, and/or perform other processing.

Receiver 600 includes analyzer 620. Analyzer 620 includes segmenter 625 for separating the first wideband waveform 610 into multiple segments 635. Segments 635 may have respective bandwidths corresponding to channel bandwidths of the channels of the system bandwidth (e.g., the same bandwidth). In some cases, segmenter 625 may separate the first wideband waveform 610 into segments 635 by applying multiple filters (such as BPFs) to the first wideband waveform 610. In some cases, segmenter 625 may include a series of filters to separate first wideband waveform 610 into segments 635, and may be implemented using a downconverting filter. For example, analyzer 620 may be structurally similar to analyzer 230-a, downconverting filter 330, or polyphase analysis bank 500. In one example, analyzer 620 may be structurally similar to analyzer 230-a with M (or more) bandpass filters 332, where M is the number of channels in channel set 615. Alternatively, analyzer 620 may include N (or more) bandpass filters 332, where N is the total number of channels of the system bandwidth.

In some cases, analyzer 620 includes downconverter 630 to downconvert the segments 635 to baseband segments 645. For example, segments 635 may each be associated with different frequency ranges and downconverter 640 may downconvert each segment 635 to a baseband frequency range.

Receiver 600 includes mapper 650 for de-mapping the segments (e.g., baseband segments 645) corresponding to the channel set 615 to the corresponding frequency ranges of synthesizer channels 690. In some cases, the remaining channels (e.g., channels of the system bandwidth that are not included in channel set 615) may be ignored. For example, the system bandwidth may include N channels while channel set 615 may include M channels. Mapper 650 may map M channels of the N channels that are in channel set 615 to a first set of M synthesizer channels 690 while NM channels of synthesizer channels 690 may not be mapped (e.g., may have a null signal mapped). In some cases, de-mapping the segments may include de-scrambling an order of the segments according to a scrambling sequence. The scrambling sequence may include an indication of a scrambled order of the segments. In some cases, the scrambling sequence includes multiple sub-groups of the waveform segments, and the sub-groups are de-mapped from respective contiguous blocks of the subset of the plurality of channels.

In some examples, mapper 650 may perform additional processing. For example, mapper 650 may perform multipath equalization of baseband segments 645 before de-mapping the baseband segments 645.

Receiver 600 includes synthesizer 660 for generating a second wideband waveform 675. Second wideband waveform 675 may have a bandwidth that is narrower than first wideband waveform 610. Synthesizer 660 includes upconverter 665 for upconverting the de-mapped segments 655 to higher frequencies. Synthesizer 660 includes combiner 670 for combining the upconverted de-mapped segments to obtain a second wideband waveform 675 having a bandwidth corresponding to the total (e.g., aggregate) bandwidth of channel set 615. In some examples, synthesizer 660 may be structurally similar to synthesizer 255-a, upconverting filter 350, or polyphase synthesis bank 505. In one example, synthesizer 660 may be structurally similar to synthesizer 255-a with M (or more) interpolators 352, image rejection filters 354, and upconverters 356, where M is the number of channels in the channel set 615.

In some cases, receiver 600 may include hardware or software to implement additional processing on second wideband waveform 675 to generate a stream of bits 680 representing second wideband waveform 675. For example, receiver 600 may include a demodulator 685 to demodulate second wideband waveform 675 to obtain the stream of bits 680. In some cases, a receiver 600 may identify a modulation scheme (e.g., from a set of modulation schemes) for demodulating the second wideband waveform 675 to obtain stream of bits 680 based on information associated with the signal (e.g., from the transmitter). Receiver 600 may demodulate the second wideband waveform 675 according to the selected modulation scheme.

Receiver 600 may provide the stream of bits 680 to a processor or other device that is coupled with receiver 600.

In one example, a system bandwidth of 45 MHz may be configured with 3 MHz channels (e.g., 15 channels). Receiver 600 may identify a channel set 615 for a first time period (e.g., a first pulse period) that includes channels 1-5, 8-10, 13, and 15 (e.g., including 10 of the 15 channels). Receiver 600 may receive a first wideband waveform 610 (e.g., via antenna(s) 605 and receiver frontend 607). The first wideband waveform 610 may have a bandwidth corresponding to the system bandwidth (e.g., 45 MHz) with substantially no signal energy (e.g., associated with the signal to be received) in channels 6, 7, 11, 12, and 14. Analyzer 620 may segment and downconvert each segment to generate 15 baseband segments 645, each representing a portion (e.g., 3 MHz) of the 45 MHz bandwidth, and each having a baseband frequency range of 0-3 MHz. Mapper 650 may map the baseband segments 645 corresponding to channel set 615 to (e.g., a first 10) synthesizer channels 690, and may map null waveforms to other synthesizer channels 690 (e.g., synthesizer channels 690 other than the first 10). Mapper 650 may map the baseband segments 645 from analyzer 620 in order, or mapper 650 may map the baseband segments 645 in a scrambled order. For example, mapper 650 may map baseband segments 1-5 to synthesizer channels 5-9, baseband segments 8-10 to synthesizer channels 2-4, baseband segment 13 to synthesizer channel 1, and baseband segment 15 to synthesizer channel 10. Synthesizer 660 may upconvert the mapped segments to frequencies corresponding to a width of channels of the system bandwidth and combine the upconverted segments to obtain a second wideband waveform 675. In this example, second wideband waveform 675 may have a bandwidth of 30 MHz.

Receiver 600 may identify a new channel set 615 for a second time period (e.g., a second pulse period), and may perform the segmenting, downconverting, mapping, upconverting, and combining to generate a second wideband waveform 675 for the second time period. New channel set 615 may be different than the channel set 615 for the first pulse period and may or may not have any channels in common with the previous channel set 615. For example, new channel set 615 may have the same or a different number of channels. It should be understood that this example is provided for the sake of clarity, and other system bandwidths and channel bandwidths are contemplated without deviating from the scope of the application. For example, the system bandwidth may be 240 MHz, and the system may have 80 channels where each channel has a 3 MHz channel bandwidth. Channel set 615 may have up to 51 channels in each pulse period and thus first wideband waveform 610 may have a bandwidth of up to 240 MHz while second wideband waveform 675 may have a bandwidth of up to 153 MHz (e.g., the system bandwidth).

In some cases, receiver 600 may include multiple antennas 605, each of which may receive a transmission from a transmitter, such as transmitter 200 described with reference to FIG. 2. The output of each antenna 605 may be processed using beamforming techniques to recover a set of segments and nulls that corresponds to one of the component versions of the waveform transmitted by the transmitter 200. Segments and nulls can then be combined such that a single set of segments and nulls corresponding to the received transmission is provided as an input to the mapper 650. In one example, the beamforming techniques and combining can be applied to the outputs of the analyzer 620, as described with reference to the example of FIG. 9. As another example, the beamforming techniques and combining can be applied to the sets of segments and nulls within the analyzer 620 (e.g., as output by the segmenter 625).

FIG. 7 illustrates an example of a portion of a transmitter 700 that supports channelizing and beamforming a wideband waveform in accordance with aspects of the present disclosure. In some examples, transmitter 700 may implement aspects of wireless communication system 100 or transmitter 200. As described herein, transmitter 700 may be configured to beamform channels of a wideband waveform during synthesis of the wideband waveform rather than beamforming the wideband waveform after it is generated. In some examples, transmitter 700 may be coupled with the outputs of mapper 250 described with reference to FIG. 2. In some cases, modulator 220, analyzer 230, mapper 250, and transmitter 700 may collectively implement a beamforming transmitter.

In some cases, transmitter 700 may receive an indication of a number K of antennas 740 that may be used for transmissions. Replicator 710 may be configured to receive mapped segments 705 (and, optionally, null segments) from a mapper, such as from mapper 250 of FIG. 2, and to generate K copies 715 of each mapped segment 705 (e.g., corresponding to the K antennas 740) to generate K sets of copies 715.

Transmitter 700 includes beamformer 720, which may include multiple component beamformers 722 (e.g., K beamformers 722-a, 722-b, 722-c, . . . 722-k) for beamforming each of the copies 715 of each mapped segment 705. In some cases, each component beamformer 722 generates multiple component segments 725 by applying beamforming coefficients 723 to one of the copies 715 of each mapped segment 705. Each beamforming coefficient may, for example, include amplitude and/or phase components applied to the copy 715 of the mapped segment 705. Thus, where a mapper outputs M mapped segments 705, beamformer 720 applies K respective sets of M beamforming coefficients 723 (e.g., K×M beamforming coefficients) to mapped segments 705 to generate K·M component segments 725. Alternatively, beamformer 720 may apply K respective sets of N beamforming coefficients 723 (e.g., K×N beamforming coefficients) to mapped segments 705 to generate K·N component segments 725 (e.g., beamformer 720 may perform beamforming for mapped and null segments). In some cases, the respective sets of beamforming coefficients 723 are based on channel frequencies of the mapped segments 705. In some cases, transmitter 700 may receive an indicator of the beamforming coefficients 723 and/or and indicator of the set of beamforming coefficients 723, and may determine the respective sets of beamforming coefficients to be applied to the copies from the indicator of the set of beamforming coefficients and the channels for the mapping.

Transmitter 700 includes combiner 730, which may include multiple component combiners 732 (e.g., K component combiners 732-a, 732-b, 732-c, . . . 732-k). Each component combiner 732 may combine the component segments 725 generated by a respective component beamformer 722 to generate a component wideband waveform 735. In some cases, transmitter 700 may transmit each of the multiple component wideband waveforms 735 using a separate antenna 740, which may result in a beamformed wideband waveform having signal energy in M channels of N total channels of a system bandwidth.

In some cases, transmitter 700 may include multiple transmitter backends 737 that includes hardware or software to implement additional processing on component wideband waveforms 735 before transmission using one or more antennas 740. For example, the component wideband waveforms 735 may be upconverted to passband before transmission.

Figure 8:
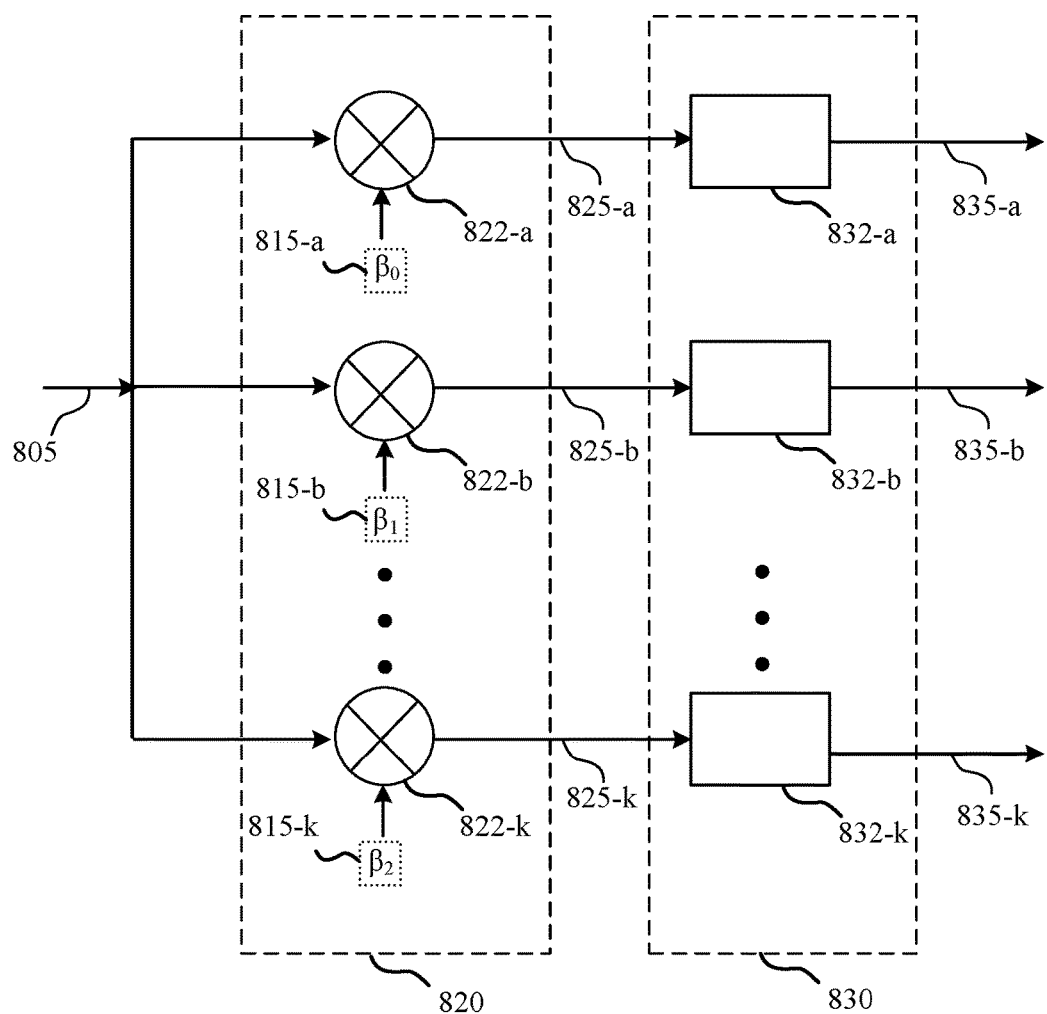
FIG. 8 illustrates an example of a channel beamforming synthesizer that supports channelizing and beamforming a wideband waveform in accordance with aspects of the present disclosure.

FIG. 8 illustrates channel beamforming synthesizer 800 that supports channelizing and beamforming a wideband waveform in accordance with aspects of the present disclosure. In some examples, channel beamforming synthesizer 800 may implement aspects of wireless communication system 100, transmitter 200, and/or transmitter 700. Channel beamforming synthesizer 800 may be configured to beamform a slice (e.g., a channel) of a wideband waveform during synthesis of the wideband waveform rather than beamforming the wideband waveform after it is generated, as described herein.

Channel beamforming synthesizer 800 includes a channel beamformer 820, which may include a set of channel component beamformers 822 (e.g., K channel component beamformers 822-a, 822-b, . . . 822-k) and a channel synthesizer 830, which may include a set of channel component synthesizers 832 (e.g., K channel component synthesizers 832-a, 832-b, . . . 832-k). In some cases, there may be one such channel beamforming synthesizer 800 for each channel of a system bandwidth (e.g., each of N channels). Alternatively, a transmitter may have M channel beamforming synthesizers 800, where M may be a number (e.g., maximum number) of channels for which a channelized beamformed signal may use for each transmission (e.g., each pulse period). Each channel component beamformer 822 may be configured to receive a mapped segment 805 and apply a beamforming coefficient 815. Thus, channel beamformer 820 may apply K coefficients to the mapped segment 805 to obtain K component segments 825 (e.g., component segments 825-a, 825-b, . . . 825-k).

Channel beamforming synthesizer 800 depicts a relatively simple form of a beamformer in which an incoming signal 805 is multiplied by a single complex coefficient. In other examples, a channel beamforming synthesizer may be implemented using an FIR filter structure, in which time taps and coefficient multiplies may provide an appropriate phase-shifting operation over a wider band of frequencies than the simple multiplication depicted in FIG. 8.

Channel synthesizer 830 may receive the component segments 825 and output component channel waveforms 835 (e.g., K component channel waveforms 835-a, 835-b, . . . , 835-k). For example, each channel component synthesizer 832 may perform interpolation, image rejection, and upconversion to generate component channel waveforms 835 that are upconverted to the channel bandwidth associated with the mapped segment. In some examples, component channel waveforms 835 from different channel beamforming synthesizers 800 may be combined into a wideband waveform and transmitted via an antenna. In some cases, channel component synthesizers 832 and a component combiner (not shown) may be implemented as a polyphase filter and inverse DFT.

Figure 9:
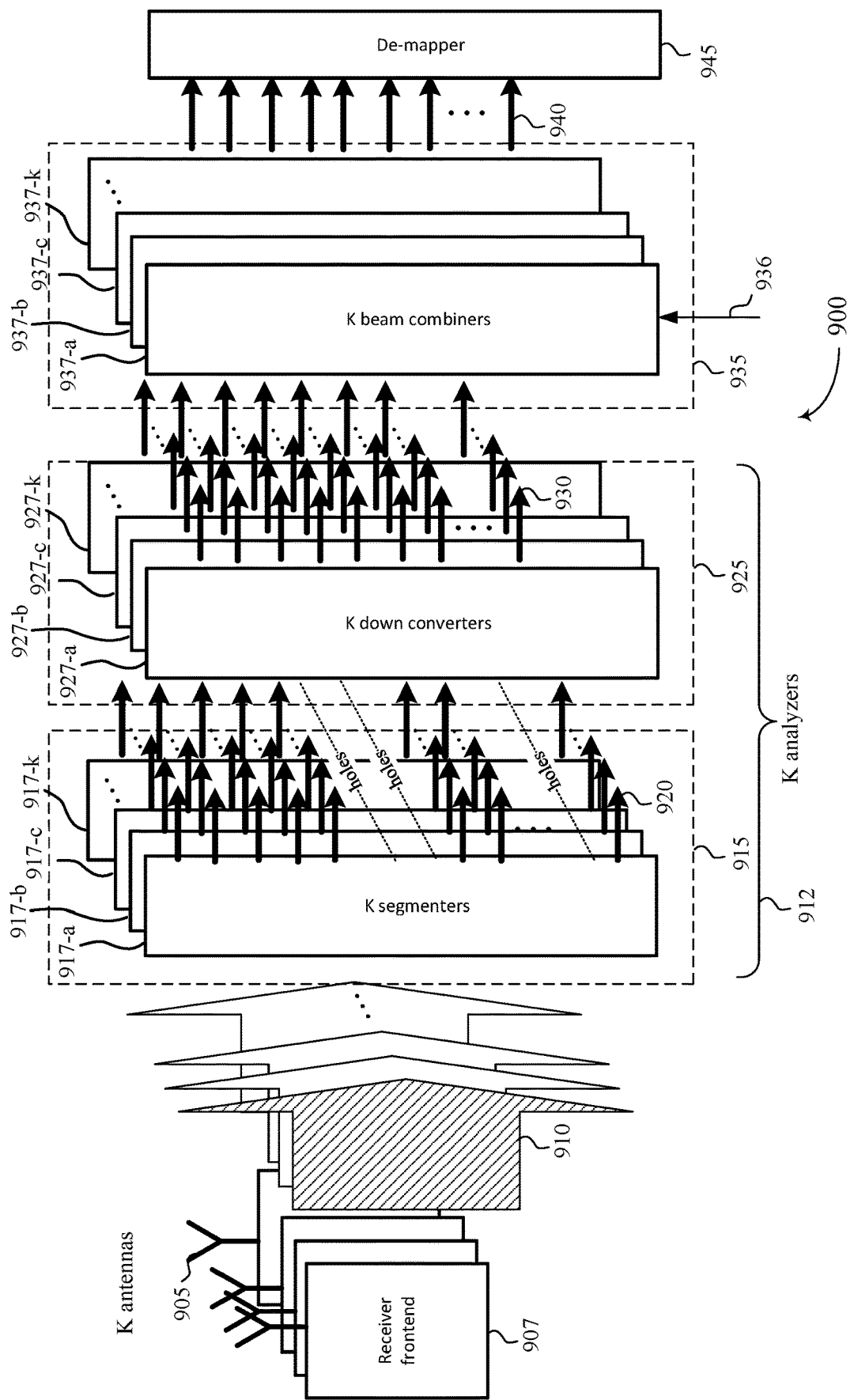
FIG. 9 illustrates an example of a portion of a receiver that supports channelizing and beamforming a wideband waveform in accordance with aspects of the present disclosure.

FIG. 9 illustrates an example of a portion of a receiver 900 that supports channelizing and beamforming a wideband waveform in accordance with aspects of the present disclosure. In some examples, receiver 900 may implement aspects of wireless communication system 100 or receiver 600. In some examples, outputs of receiver 900 may serve as the inputs to synthesizer 660 described with reference to FIG. 6. In some cases, receiver 900, synthesizer 660, and demodulator 685 may collectively implement a beamforming receiver.

Receiver 900 may receive, using K antennas 905, K component wideband waveforms 910. Receiver 900 includes segmenter 915, which may include multiple component segmenters 917 (e.g., K segmenters 917-a, 917-b, 917-c, . . . 917-k) for separating each of the component wideband waveforms 910 into a corresponding set of component segments 920. Each component segment 920 may be associated with a corresponding channel of the system bandwidth. Each segmenter 917 may be an example of a segmenter 625 as described with reference to FIG. 6.

In some cases, receiver 900 may include a receiver frontend 907 that includes hardware or software to process signals received using antenna(s) 905 to generate component wideband waveforms 910. For example, receiver frontend 907 may filter the received signals, mix the signals, perform analog-to-digital conversion, and/or perform other processing.

Receiver 900 may include downconverter 925, which may include multiple component downconverters 927 (e.g., K downconverters 927-a, 927-b, 927-c, . . . 927-k) to downconvert respective component segments 920 to component baseband segments 930. For example, component segments 920 may each be associated with different frequency ranges and downconverter 927 may downconvert each component segment 920 to a baseband frequency range. Each downconverter 927 may be an example of a downconverter 630 as described with reference to FIG. 6.

In some cases, segmenter 915 and downconverter 925 may be collectively referred to as an analyzer, which may be an example of an analyzer 620 as described with reference to FIG. 6.

Receiver 900 includes beam combiner 935, which may include multiple component beam combiners 937 (e.g., K component beam combiners 937-a, 937-b, 937-c, . . . 937-k). Beam combiner 935 may apply beamforming coefficients 936 to component baseband segments 930 generated by downconverters 927 and combine component segments associated with the same corresponding channel to generate beamformed component segments 940. In some cases, K component baseband segments corresponding to each of M channels are combined by beam combiners 937 to produce the M segments of the wideband waveform originated by the transmitter. In some cases, beam combiner 935 may implement an inverse of the beamforming performed by beamformer 720 described with reference to FIG. 7.

In some cases, beam combiner 935 may implement an inverse of the beamforming performed by beamformer 720 described with reference to FIG. 7.

In some cases, beamformed component segments 940 may be provided to a de-mapper 945 that is configured to de-map the beamformed component segments 940 from the corresponding channels. In some cases, de-mapper 945 may be the same as mapper 650 described with reference to FIG. 6, and may perform an inverse of the mapping performed by mapper 650.

Figure 10:
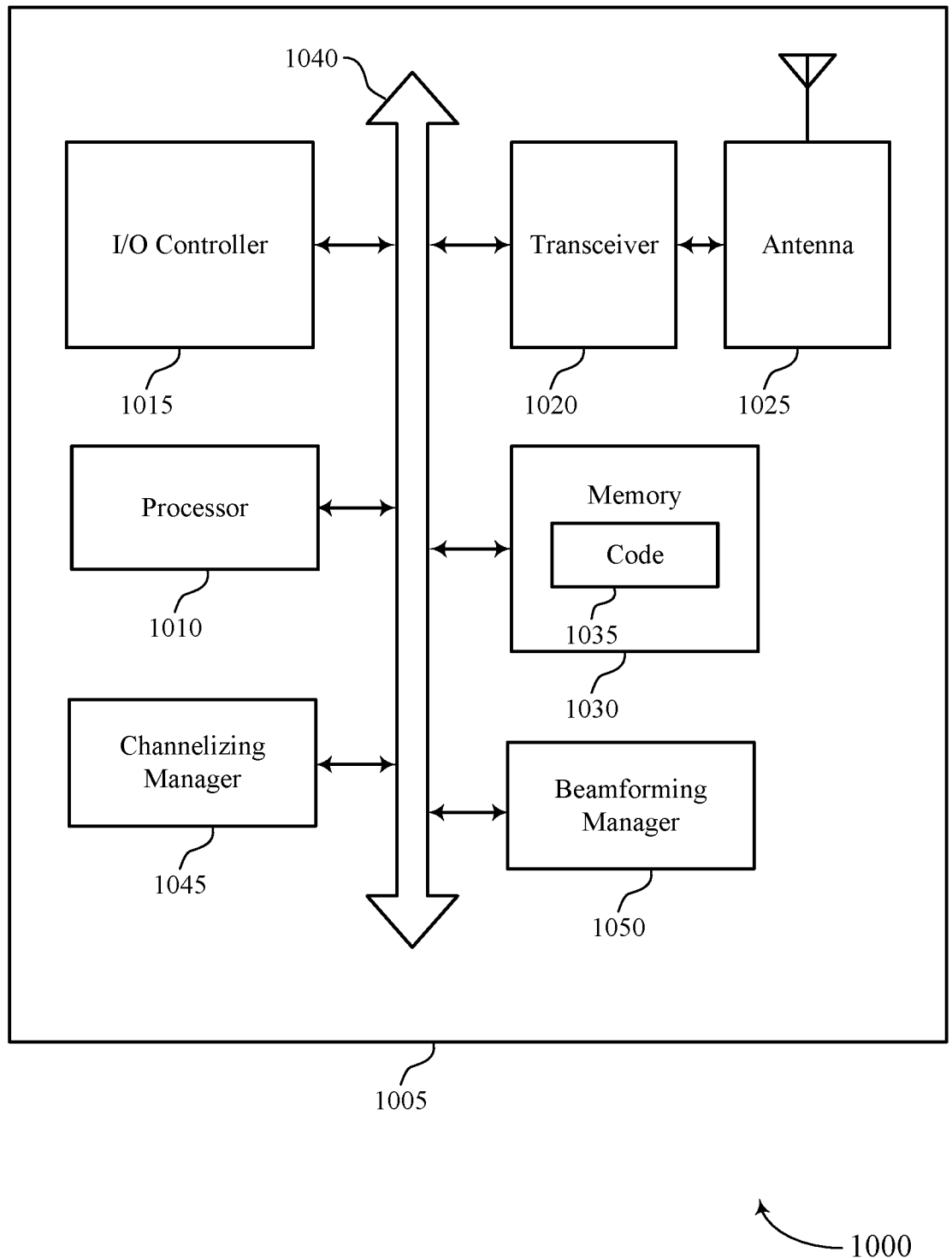
FIG. 10 illustrates an example of a device that supports channelizing and beamforming a wideband waveform in accordance with aspects of the present disclosure.

FIG. 10 shows a diagram of a system 1000 including a device 1005 that supports channelizing and beamforming a wideband waveform in accordance with aspects of the present disclosure. The device 1005 may include components for bi-directional communications of wideband waveforms including components for transmitting and receiving communications, including a processor 1010, an I/O controller 1015, a transceiver 1020, an antenna 1025, and memory 1030. These components may be in electronic communication via one or more buses (e.g., bus 1040).

The processor 1010 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1010 may be configured to operate a memory array using a memory controller. In other cases, a memory controller may be integrated into the processor 1010. The processor 1010 may be configured to execute computer-readable instructions stored in a memory (e.g., memory 1030) to cause the device 1005 to perform various functions (e.g., functions or tasks supporting channelizing and beamforming a wideband waveform).

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate signals and provide the modulated signals to the antennas for transmission, and to demodulate signals received from the antennas.

In some cases, the wireless device may include a single antenna 1025. However, in some cases the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support methods for transmitting and/or receiving channelized and beamformed wideband waveforms as described herein. For example, the code 1035 may include instructions for performing (e.g., by the processor 1010 and/or the transceiver 1020) the functions of the modulator 210, the analyzer 230 or 620, the mapper 250 or 650, the synthesizer 255 or 660, and/or the demodulator 685. The code 1035 may be stored in a non-transitory computer-readable medium such as system memory or other type of memory. In some cases, the code 1035 may not be directly executable by the processor 1010 but may cause a computer (e.g., when compiled and executed) to perform functions described herein.

The device 1005 may include channelizing manager 1045. Channelizing manager 1045 may generate multiple segments of a first wideband waveform and map the segments to corresponding channels, each of which may have a respective channel bandwidth. Channelizing manager 1045 may generate multiple copies of each segment, where each copy of a respective segment is associated with a corresponding antenna of multiple antennas for a transmission.

The device 1005 may include beamforming manager 1050. Beamforming manager 1050 may apply respective sets of beamforming coefficients to the copies for the mapped segments to obtain multiple component segments for each of the mapped segments, where the respective sets of beamforming coefficients for the mapped segments are based on channels of the multiple channels for the mapping. Beamforming manager 1050 may combine the component segments associated with each of the antennas into respective component wideband waveforms.

Figure 11:
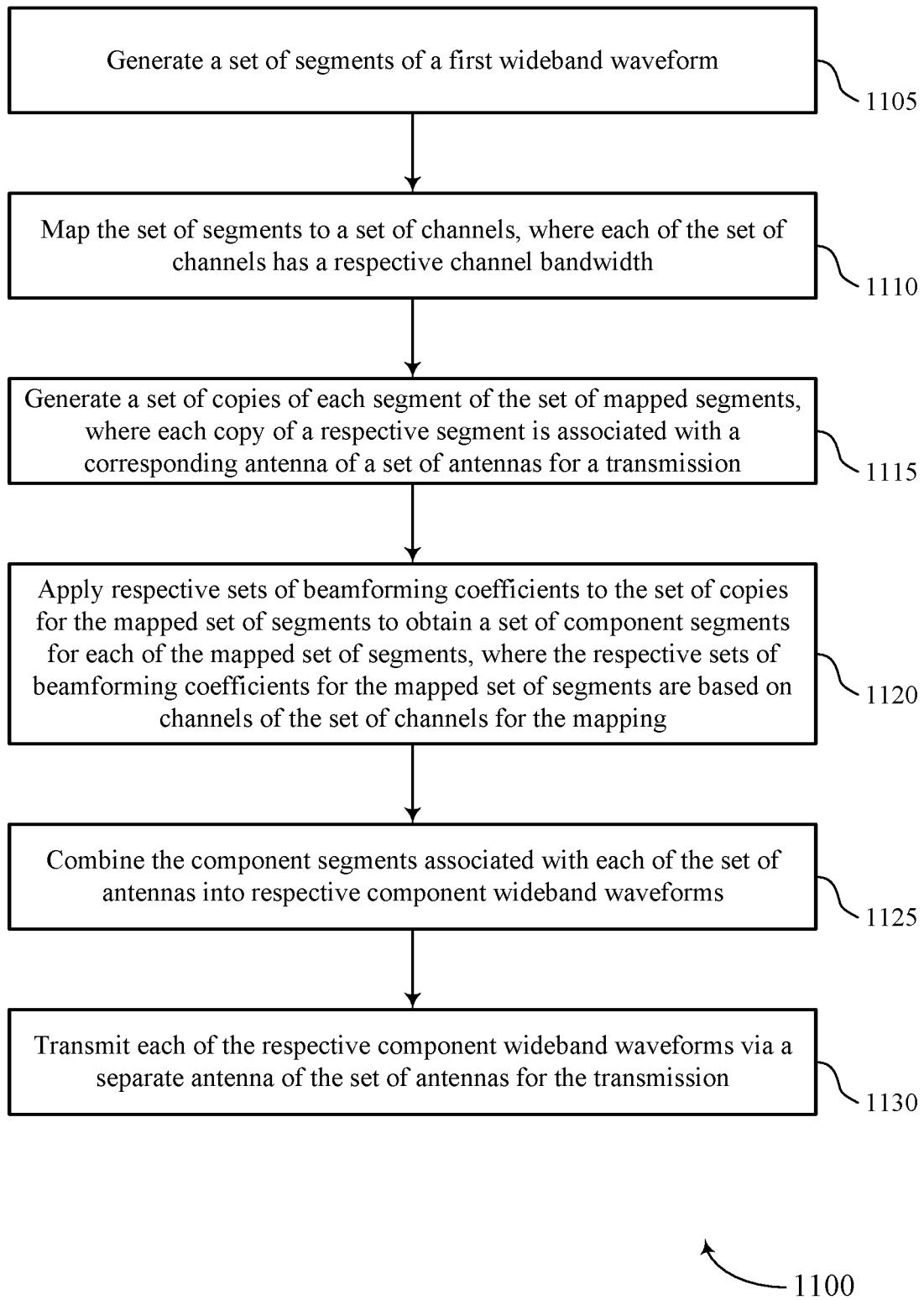
FIGS. 11 and 12 show flowcharts illustrating methods that support channelizing and beamforming a wideband waveform in accordance with aspects of the present disclosure.

FIG. 11 shows a flowchart illustrating a method 1100 that supports channelizing and beamforming a wideband waveform in accordance with aspects of the present disclosure. The operations of method 1100 may be implemented by a transmitter or its components as described herein. For example, the operations of method 1100 may be performed by a transmitter as described with reference to FIGS. 2 and 7. In some examples, a transmitter may execute a set of instructions to control the functional elements of the transmitter to perform the described functions. Additionally or alternatively, a transmitter may perform aspects of the described functions using special-purpose hardware, programmable logic, or other means.

At 1105, the transmitter may generate a set of segments of a first wideband waveform. The operations of 1105 may be performed according to the methods described herein. In some examples, aspects of the operations of 1105 may be performed by a segmenter as described with reference to FIGS. 2 and 7.

At 1110, the transmitter may map the set of segments to a set of channels, where each of the set of channels has a respective channel bandwidth. The operations of 1110 may be performed according to the methods described herein. In some examples, aspects of the operations of 1110 may be performed by a mapper as described with reference to FIGS. 2 and 7.

At 1115, the transmitter may generate a set of copies of each segment of the set of mapped segments, where each copy of a respective segment is associated with a corresponding antenna of a set of antennas for a transmission. The operations of 1115 may be performed according to the methods described herein. In some examples, aspects of the operations of 1115 may be performed by a replicator as described with reference to FIG. 7.

At 1120, the transmitter may apply respective sets of beamforming coefficients to the set of copies for the mapped set of segments to obtain a set of component segments for each of the mapped set of segments, where the respective sets of beamforming coefficients for the mapped set of segments are based on channels of the set of channels for the mapping. The operations of 1120 may be performed according to the methods described herein. In some examples, aspects of the operations of 1120 may be performed by a beamformer as described with reference to FIG. 7.

At 1125, the transmitter may combine the component segments associated with each of the set of antennas into respective component wideband waveforms. The operations of 1125 may be performed according to the methods described herein. In some examples, aspects of the operations of 1125 may be performed by a combiner as described with reference to FIGS. 2 and 7.

At 1130, the transmitter may transmit each of the respective component wideband waveforms via a separate antenna of the set of antennas for the transmission. The operations of 1130 may be performed according to the methods described herein. In some examples, aspects of the operations of 1130 may be performed by a transceiver and antennas as described with reference to FIG. 10.

Figure 12:
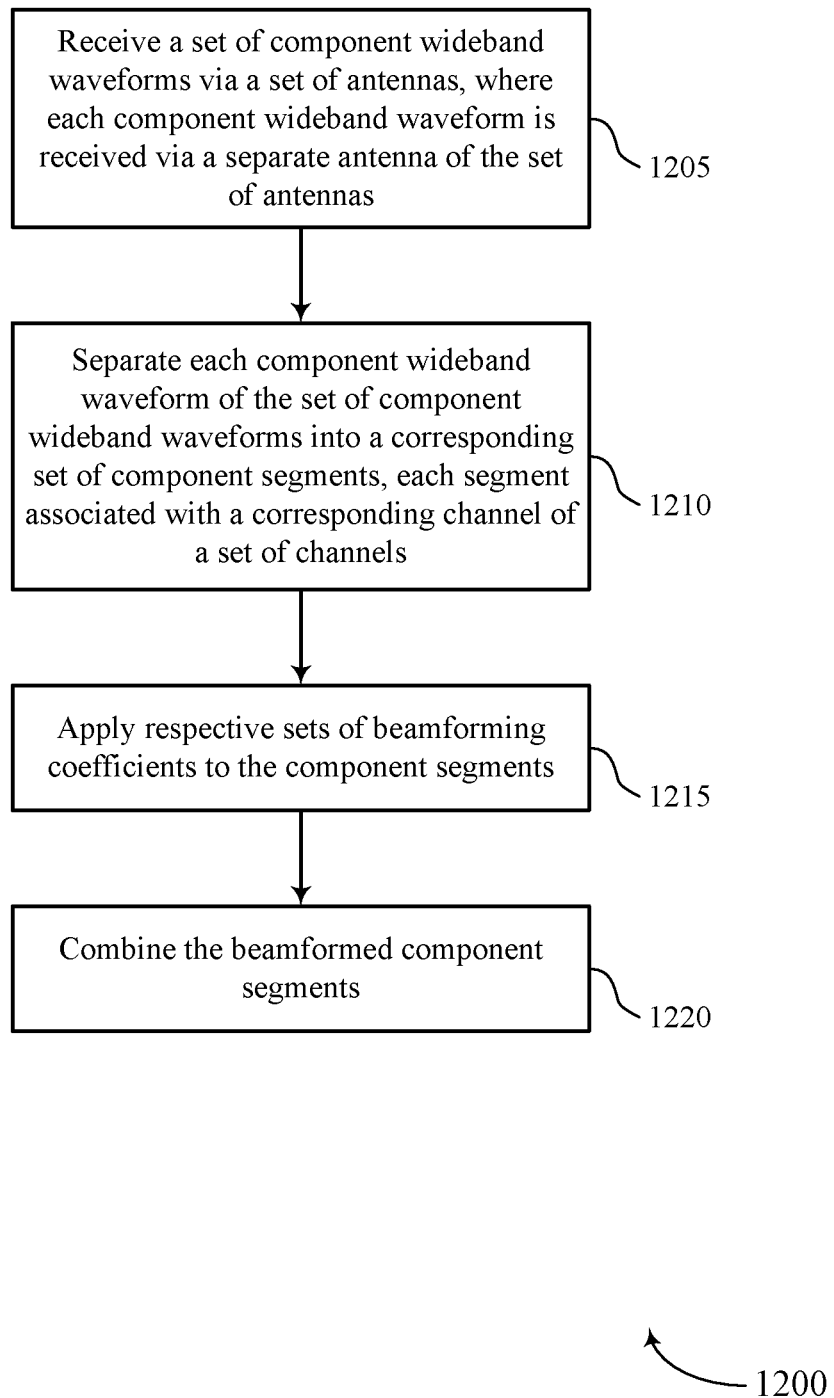

FIG. 12 shows a flowchart illustrating a method 1200 that supports channelizing and beamforming a wideband waveform in accordance with aspects of the present disclosure. The operations of method 1200 may be implemented by a receiver or its components as described herein. For example, the operations of method 1200 may be performed by a receiver as described with reference to FIGS. 6 and 9. In some examples, a receiver may execute a set of instructions to control the functional elements of the receiver to perform the described functions. Additionally or alternatively, a receiver may perform aspects of the described functions using special-purpose hardware.

At 1205, the receiver may receive a set of component wideband waveforms via a set of antennas, where each component wideband waveform is received via a separate antenna of the set of antennas. The operations of 1205 may be performed according to the methods described herein. In some examples, aspects of the operations of 1205 may be performed by a transceiver and antennas as described with reference to FIG. 10.

At 1210, the receiver may separate each component wideband waveform of the set of component wideband waveforms into a corresponding set of component segments, each segment associated with a corresponding channel of a set of channels. The operations of 1210 may be performed according to the methods described herein. In some examples, aspects of the operations of 1210 may be performed by a segmenter as described with reference to FIGS. 6 and 9.

At 1215, the receiver may apply respective sets of beamforming coefficients to the component segments. The operations of 1215 may be performed according to the methods described herein. In some examples, aspects of the operations of 1215 may be performed by a beam combiner as described with reference to FIG. 9.

At 1220, the receiver may combine the beamformed component segments. The operations of 1220 may be performed according to the methods described herein. In some examples, aspects of the operations of 1220 may be performed by a beam combiner as described with reference to FIG. 9.

It should be noted that the methods described herein describe possible implementations, and that the operations and the steps may be rearranged or otherwise modified and that other implementations are possible. Further, aspects from two or more of the methods may be combined.

What is claimed is:

1. A method, comprising:
    generating a plurality of segments of a first wideband waveform;
    mapping the plurality of segments to a plurality of channels, wherein each of the plurality of channels has a respective channel bandwidth;
    generating a plurality of copies of each segment of the plurality of mapped segments, wherein each copy of a respective segment is associated with a corresponding antenna of a plurality of antennas for a transmission;
    applying respective sets of beamforming coefficients to the plurality of copies for the mapped plurality of segments to obtain a plurality of component segments for each of the mapped plurality of segments, wherein the respective sets of beamforming coefficients for the mapped plurality of segments are based at least in part on channels of the plurality of channels for the mapping;
    combining the component segments associated with each of the plurality of antennas into respective component wideband waveforms; and
    transmitting each of the respective component wideband waveforms via a separate antenna of the plurality of antennas for the transmission.

2. The method of claim 1, further comprising:
    downconverting the plurality of segments to a baseband frequency range before mapping the plurality of segments to the plurality of channels.

3. The method of claim 1, further comprising:
    receiving an indicator of a set of beamforming coefficients; and
    determining the respective sets of beamforming coefficients from the indicator of the set of beamforming coefficients and the channels of the plurality of channels for the mapping.

4. The method of claim 1, wherein the plurality of channels comprises a subset of a total set of channels of a system bandwidth that are available for the transmitting.

5. The method of claim 4, wherein the subset of the total set of channels is a non-contiguous subset of the total set of channels.

6. The method of claim 1, wherein transmitting each of the respective component wideband waveforms comprises:
    transmitting each of the respective component wideband waveforms using a tactical data link.

7. A method, comprising:
receiving a plurality of component wideband waveforms via a plurality of antennas, wherein each component wideband waveform is received via a separate antenna of the plurality of antennas;
separating each component wideband waveform of the plurality of component wideband waveforms into a corresponding plurality of component segments, each segment associated with a corresponding channel of a plurality of channels;
applying respective sets of beamforming coefficients to the component segments; and
combining component segments associated with the same corresponding channel to generate beamformed component segments.

8. The method of claim 7, further comprising:
downconverting the component segments before applying the respective sets of beamforming coefficients to the component segments.

9. The method of claim 7, further comprising:
de-mapping the beamformed component segments from the corresponding channels of the plurality of channels.

10. The method of claim 9, further comprising:
receiving an indicator of a set of beamforming coefficients; and
determining the respective sets of beamforming coefficients from the indicator of the set of beamforming coefficients and the corresponding channels of the plurality of channels for the de-mapping.

11. A method, comprising:
receiving a plurality of component wideband waveforms via a plurality of antennas, wherein each component wideband waveform is received via a separate antenna of the plurality of antennas;
separating each component wideband waveform of the plurality of component wideband waveforms into a corresponding plurality of component segments, each segment associated with a corresponding channel of a plurality of channels;
applying respective sets of beamforming coefficients to the component segments; and combining the beamformed component segments,
wherein the corresponding channels comprise a subset of a total set of channels of a system bandwidth that are available for the transmitting.

12. The method of claim 11, wherein the subset of the total set of channels is a non-contiguous subset of the total set of channels.

13. A method, comprising:
receiving a plurality of component wideband waveforms via a plurality of antennas, wherein each component wideband waveform is received via a separate antenna of the plurality of antennas;
separating each component wideband waveform of the plurality of component wideband waveforms into a corresponding plurality of component segments, each segment associated with a corresponding channel of a plurality of channels;
applying respective sets of beamforming coefficients to the component segments; and combining the beamformed component segments,
wherein receiving each of the respective component wideband waveforms comprises:
receiving the respective component wideband waveforms using a tactical data link.

14. The method of claim 13, wherein the respective component wideband waveforms are transmitted by a single transmitter associated with a network of the tactical data link.

15. The method of claim 14, further comprising:
receiving, from a second single transmitter from a second network of the tactical data link, a second plurality of component wideband waveforms via the plurality of antennas, wherein each component wideband waveform of the second plurality of component wideband waveforms is received via a separate antenna of the plurality of antennas;
separating each component wideband waveform of the second plurality of component wideband waveforms into a corresponding second plurality of component segments, each segment of the second plurality of component segments associated with a corresponding channel of a second plurality of channels;
applying respective second sets of beamforming coefficients to the component segments of the second plurality of component segments; and
combining the beamformed component segments of the second plurality of component segments.

16. An apparatus, comprising:
a modulator configured to generate a first wideband waveform;
an analyzer coupled with the modulator and configured to receive the first wideband waveform and generate a plurality of segments of a first wideband waveform, each segment having a same bandwidth;
a mapper configured to map the plurality of segments to a plurality of channels;
a replicator configured to generate a plurality of copies of each segment of the plurality of mapped segments, wherein each copy of a respective segment is associated with a corresponding antenna of a plurality of antennas for a transmission;
a plurality of beamformers configured to apply respective sets of beamforming coefficients to the sets of copies for the mapped plurality of segments to obtain a plurality of component segments for each of the mapped plurality of segments, wherein the respective sets of beamforming coefficients for the mapped plurality of segments are based at least in part on channels of the plurality of channels for the mapping;
a plurality of combiners, each combiner coupled with a beamformer of the plurality of beamformers and configured to combine the component segments associated with a respective antenna of the plurality of antennas into respective component wideband waveforms; and
a transmitter backend coupled with the combiner and configured to transmit the transmission by transmitting each of the respective component wideband waveforms via a separate antenna of the plurality of antennas.

17. The apparatus of claim 16, wherein each beamformer is configured to downconvert the plurality of segments to a baseband frequency range.

18. The apparatus of claim 16, further comprising:
a beamforming coefficient processor coupled with the plurality of beamformers and configured to receive an indicator of a set of beamforming coefficients and determine the respective sets of beamforming coefficients from the indicator of the set of beamforming coefficients and the channels of the plurality of channels for the mapping.

19. The apparatus of claim 16, wherein the plurality of channels comprises a subset of a total set of channels of a system bandwidth that are available for the transmitting.

20. The apparatus of claim 19, wherein the subset of the total set of channels is a non-contiguous subset of the total set of channels.

21. The apparatus of claim 16, wherein the transmitter backend is configured to transmit each of the respective component wideband waveforms by transmitting each of the respective component wideband waveforms using a tactical data link.

22. An apparatus, comprising:
a receiver frontend configured to receive a plurality of component wideband waveforms via a plurality of antennas, wherein each component wideband waveform is received via a separate antenna of the plurality of antennas;
a plurality of analyzers coupled with the receiver frontend, each analyzer configured to separate a respective component wideband waveform of the plurality of component wideband waveforms into a corresponding plurality of component segments, each component segment associated with a corresponding channel of a plurality of channels; and
a plurality of beam combiners coupled with the plurality of analyzers, each beam combiner configured to apply a respective set of beamforming coefficients to respective component segments and combine component segments associated with the same corresponding channel to generate beamformed component segments.

23. The apparatus of claim 22, wherein each analyzer comprises a downconverting filter to downconvert respective component segments.

24. The apparatus of claim 22, further comprising:
a de-mapper coupled with the plurality of beam combiners and configured to de-map the beamformed component segments from the corresponding channels of the plurality of channels.

25. The apparatus of claim 24, wherein the beam combiner is configured to receive an indicator of a set of beamforming coefficients and determine the respective sets of beamforming coefficients from the indicator of the set of beamforming coefficients and the corresponding channels of the plurality of channels for the de-mapping.

26. The apparatus of claim 22, wherein the corresponding channels comprise a subset of a total set of channels of a system bandwidth that are available for the transmitting.

27. The apparatus of claim 26, wherein the subset of the total set of channels is a non-contiguous subset of the total set of channels.

28. The apparatus of claim 22, wherein the receiver frontend is configured to receive each of the respective component wideband waveforms using a tactical data link.

29. The apparatus of claim 28, wherein the respective component wideband waveforms are transmitted by a single transmitter associated with a network of the tactical data link.

30. The apparatus of claim 29, wherein:
the receiver frontend is configured to receive, from a second single transmitter from a second network of the tactical data link, a second plurality of component wideband waveforms via the plurality of antennas, wherein each component wideband waveform of the second plurality of component wideband waveforms is received via a separate antenna of the plurality of antennas;
each analyzer is configured to separate each component wideband waveform of the second plurality of component wideband waveforms into a corresponding second plurality of component segments, each segment of the second plurality of component segments associated with a corresponding channel of a second plurality of channels; and
each beam combiner is configured to apply a respective second set of beamforming coefficients to the component segments of the second plurality of component segments and combine the beamformed component segments of the second plurality of component segments.

* * * * *